United States Patent
Kurata et al.

(10) Patent No.: US 10,731,992 B2
(45) Date of Patent: Aug. 4, 2020

(54) INFORMATION PROCESSING DEVICE, INFORMATION PROCESSING METHOD, AND PROGRAM

(71) Applicant: SONY CORPORATION, Tokyo (JP)

(72) Inventors: Masatomo Kurata, Tokyo (JP); Tomohisa Takaoka, Kanagawa (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 152 days.

(21) Appl. No.: 15/571,549

(22) PCT Filed: Apr. 18, 2016

(86) PCT No.: PCT/JP2016/062295
§ 371 (c)(1),
(2) Date: Nov. 3, 2017

(87) PCT Pub. No.: WO2017/018009
PCT Pub. Date: Feb. 2, 2017

(65) Prior Publication Data
US 2018/0143025 A1    May 24, 2018

(30) Foreign Application Priority Data
Jul. 28, 2015    (JP) .................. 2015-148383

(51) Int. Cl.
*G01C 21/20*    (2006.01)
*G06F 13/00*    (2006.01)
(Continued)

(52) U.S. Cl.
CPC ......... *G01C 21/206* (2013.01); *G01C 21/005* (2013.01); *G01C 21/26* (2013.01);
(Continued)

(58) Field of Classification Search
CPC .... G01C 21/26; G01C 21/206; G01C 21/005; G06F 13/00; G06F 13/4027; G08G 1/005;
(Continued)

(56) References Cited

U.S. PATENT DOCUMENTS 5,050,077 A * 9/1991 Vincent ................ G06Q 10/109
  705/7.19
5,790,974 A * 8/1998 Tognazzini .......... G01C 21/343
  340/988

(Continued)

FOREIGN PATENT DOCUMENTS

JP    2009-141721 A    6/2009
JP    2010-537342 A    2/2010
(Continued)

*Primary Examiner* — Ramsey Refai
(74) *Attorney, Agent, or Firm* — Paratus Law Group, PLLC

(57) ABSTRACT

There is provided an information processing device that makes it possible to update and report the destination or route to be presented depending on the situation of a user who shares the situation or destination of another user, the information processing device including: a processing unit configured to perform action support for a subsequent schedule to be optimal for each of a plurality of target users on the basis of user situation in indoor environment acquired for each target user that participates in the subsequent schedule.

15 Claims, 12 Drawing Sheets

(51) Int. Cl.
  *G01C 21/26* (2006.01)
  *G08G 1/005* (2006.01)
  *G06F 13/40* (2006.01)
  *G01C 21/00* (2006.01)
  *G06Q 10/10* (2012.01)
  *G09B 29/10* (2006.01)
  *H04W 4/02* (2018.01)
  *G09B 29/00* (2006.01)

(52) U.S. Cl.
  CPC .......... *G06F 13/00* (2013.01); *G06F 13/4027* (2013.01); *G06Q 10/109* (2013.01); *G08G 1/005* (2013.01); *G09B 29/106* (2013.01); *H04W 4/025* (2013.01); *G09B 29/007* (2013.01)

(58) Field of Classification Search
  CPC ... G06Q 10/109; H04W 4/025; G09B 29/007; G09B 29/106
  See application file for complete search history.

(56) References Cited

U.S. PATENT DOCUMENTS

| | | | |
|---|---|---|---|
| 6,937,853 B2* | 8/2005 | Hall | G06Q 10/10 379/88.13 |
| 7,027,995 B2* | 4/2006 | Kaufman | G06Q 10/109 705/7.12 |
| 7,881,233 B2* | 2/2011 | Bieselin | H04L 12/1845 370/260 |
| 8,346,589 B1* | 1/2013 | Norton | G06Q 10/1093 705/7.18 |
| 8,538,687 B2* | 9/2013 | Plocher | G01C 21/20 701/433 |
| 8,842,153 B2* | 9/2014 | Ranganath | H04M 3/565 348/14.01 |
| 9,285,227 B1* | 3/2016 | Chao | G01C 21/32 |
| 9,451,414 B1* | 9/2016 | Birkenes | G06Q 10/1095 |
| 9,546,874 B2* | 1/2017 | Compton | G01C 21/206 |
| 9,741,020 B2* | 8/2017 | Min | G06Q 10/1095 |
| 9,877,298 B1* | 1/2018 | Knas | H04W 64/00 |
| 2009/0017803 A1* | 1/2009 | Brillhart | G01C 21/20 455/414.2 |
| 2011/0113148 A1* | 5/2011 | Salmela | G01C 21/00 709/229 |
| 2011/0191019 A1* | 8/2011 | Holsinger | G01C 21/00 701/533 |
| 2012/0143495 A1* | 6/2012 | Dantu | G01C 21/206 701/428 |
| 2012/0173137 A1 | 7/2012 | Compton et al. | |
| 2015/0149231 A1* | 5/2015 | Nicolas | G06C 10/1095 705/7.19 |
| 2015/0248651 A1* | 9/2015 | Akutagawa | G06Q 10/1095 705/7.19 |
| 2015/0371196 A1* | 12/2015 | Lee | G06Q 10/1095 705/7.19 |
| 2016/0084664 A1* | 3/2016 | Margalit | G01C 21/3438 701/410 |
| 2016/0148163 A1* | 5/2016 | Beaumont | G06Q 10/1095 705/7.19 |
| 2017/0026806 A1* | 1/2017 | Jampani | H04B 17/318 |

FOREIGN PATENT DOCUMENTS

| | | |
|---|---|---|
| JP | 2015-046047 A | 3/2015 |
| WO | WO 2014/132802 A1 | 9/2014 |

* cited by examiner

FIG. 5

|        | A   | B   | C   | P   |
|--------|-----|-----|-----|-----|
| Room A | Xaa | Xab | Xac | Xad |
| Room B | Xba | Xbb | Xbc | Xbd |
| Room C | Xca | Xcb | Xcc | Xcd |
| Room D | Xda | Xdb | Xdc | Xdd |

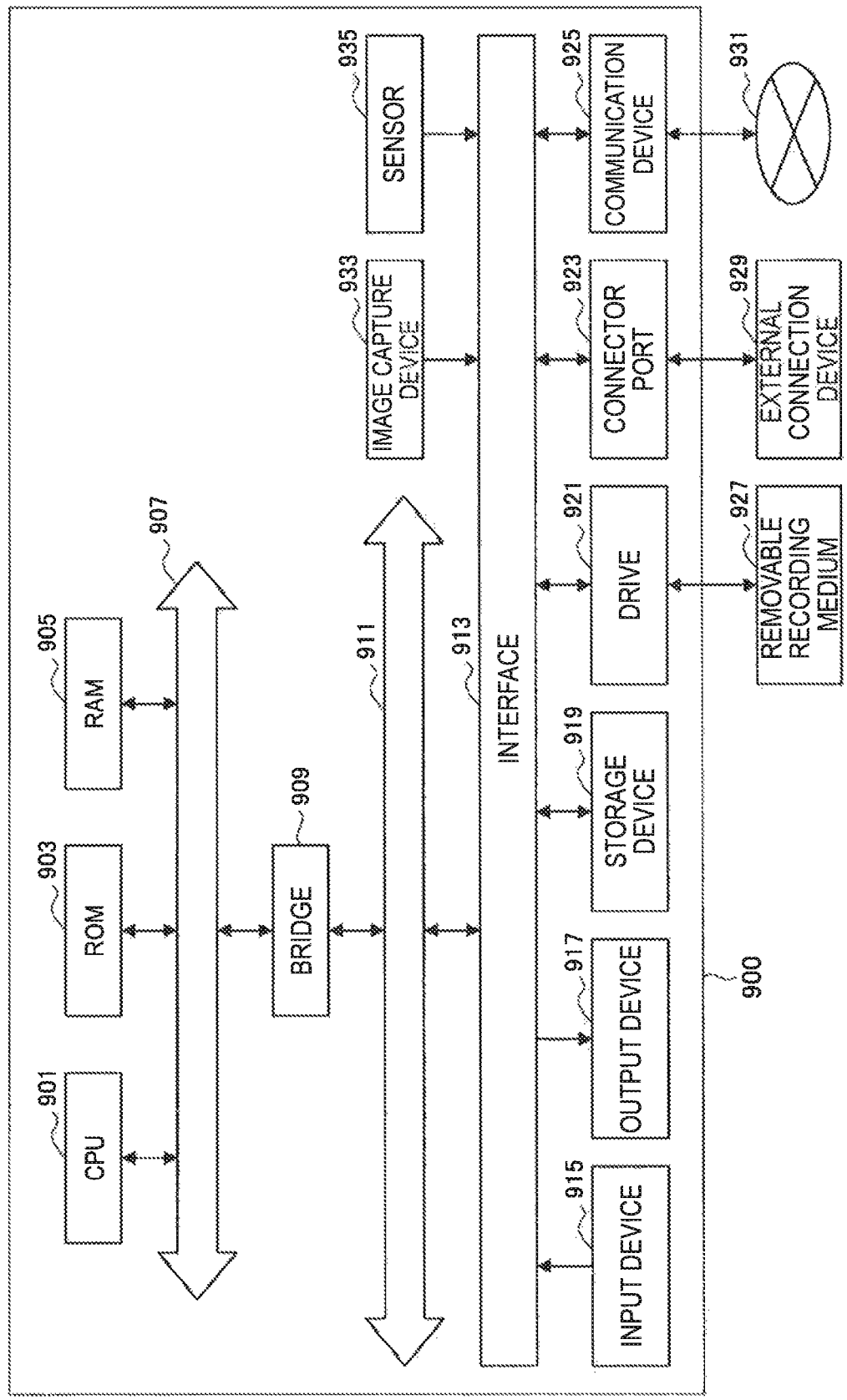

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/062295 (filed on Apr. 18, 2016) under 35 U.S.C. § 371, which claims priority to Japanese Patent Application No. 2015-148383 (filed on Jul. 28, 2015), which are all hereby incorporated by reference in their entirety.

TECHNICAL FIELD

The present disclosure relates to an information processing device, an information processing method, and a program.

BACKGROUND ART

A system that navigates to a destination using positioning information is commonly used. The navigation technique in related art sets a destination by using information manually input by a user, preset schedule information, or the like. However, considering the current situation, in some cases, the original destination is no longer an optimal destination at that time. In one example, Patent Literature 1 discloses a technique for informing the opposite party of a schedule change, user's situation, or the like via electronic mail in a short time with a simple operation.

CITATION LIST

Patent Literature

Patent Literature 1: JP 2009-141721A

DISCLOSURE OF INVENTION

Technical Problem

In recent years, with the advent of wearable terminals worn by users, information presentation services and interaction functions that recognize the user's action and situation are demanded. In one example, in navigation, it is desirable to update and report the destination or route to be presented depending on the situation of a user who shares the situation or destination of another user without necessitating a user's operation as with the technique that is disclosed in the above-mentioned Patent Literature 1.

Solution to Problem

According to the present disclosure, there is provided an information processing device including: a processing unit configured to perform action support for a subsequent schedule to be optimal for each of a plurality of target users on the basis of user situation in indoor environment acquired for each target user that participates in the subsequent schedule.

In addition, according to the present disclosure, there is provided an information processing method including: performing, by a processor, action support for a subsequent schedule to be optimal for each of a plurality of target users on the basis of user situation in indoor environment acquired for each target user that participates in the subsequent schedule.

Furthermore, according to the present disclosure, there is provided a program causing a computer to function as an information processing device including: a processing unit configured to perform action support for a subsequent schedule to be optimal for each of a plurality of target users on the basis of user situation in indoor environment acquired for each target user that participates in the subsequent schedule.

Advantageous Effects of Invention

According to the present disclosure as described above, it is possible to update the destination and route to be presented depending on the situation of a user who shares the situation or destination of another user. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrated to describe a relative distance between each target user and each conference room.

FIG. 12 is a block diagram illustrating a hardware configuration example of a user terminal or a server according to an embodiment of the present disclosure.

MODE(S) FOR CARRYING OUT THE INVENTION

Figure 1:
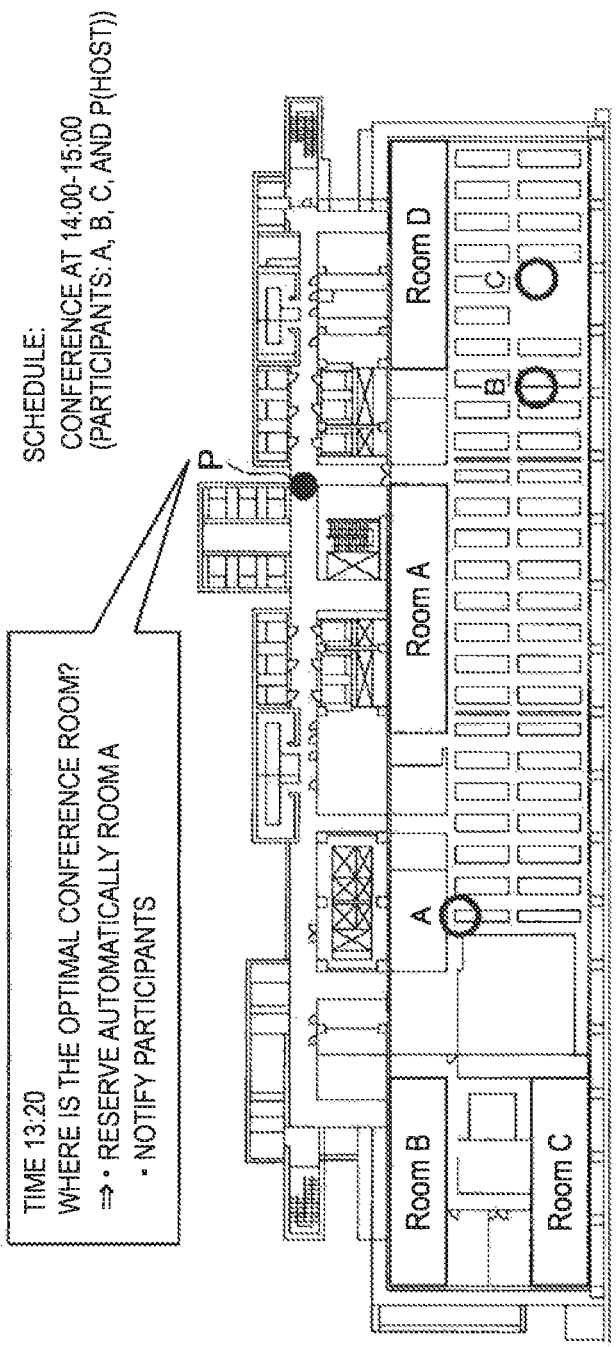
FIG. 1 is a diagram illustrated to describe an action support function of an information processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Moreover, the description is given in the following order.
1. First Embodiment (action support to conference participants)
1.1. Overview
1.2. System Configuration
1.3. Action Support Processing
2. Second Embodiment (meeting inside station)
3. Third Embodiment (meeting in shopping mall or the like)
4. Hardware Configuration
5. Supplement 1. First Embodiment

[1.1. Overview]

An overview of an information processing system according to a first embodiment of the present disclosure is now described with reference to FIG. 1. Moreover, FIG. 1 is a diagram illustrated to describe an action support function of the information processing system according to the present embodiment.

The information processing system according to the present embodiment is a system that performs action support for making the user's daily life and work efficient. The information processing system determines a target user who performs action support on the basis of the user's schedule information or action prediction information. Examples of the action support performed by the information processing system include displaying positioning information of each target user on a map, determining a current optimal seat position from the current position and schedule of the target user and guiding the user to it, or performing reservation management of an optimal meeting place (e.g., conference room).

The present embodiment describes, in an office environment, a case of specifying an office worker to be a target user of the subsequent schedule on the basis of schedule information or the like and performing reservation of a conference room and navigation to the conference room, as an example of action support by the information processing system. In one example, as illustrated in FIG. 1, it is assumed that four people P, A, B, and C are scheduled to participate in a conference starting from 14 o'clock, which is registered as schedule information.

The information processing system checks the schedule information at a predetermined timing, and determines the subsequent schedule to perform the action support in this system. Upon determining a target to support, the information processing system selects a participant to a conference to support as a target user to perform the action support. Then, the information processing system acquires the current situation of the target user, selects a conference room for the conference, and guides the target user to the conference room.

In the example illustrated in FIG. 1, it is assumed that the time (current time) at which the schedule information is checked is 13:20 and the conference to be held from 14 o'clock is determined as a subsequent target to support. The information processing system, when selecting the users P, A, B, and C participating in the conference as the target user performing the action support, acquires the situation of each of the users. It is assume that the users P, A, B, and C are recognized to be at different places in the office environment of the floor layout as illustrated in FIG. 1, from the acquired situation of each user. In considering of this situation, the information processing system selects, in one example, "Room A" at the approximate center of the current position of each user, as a conference room, for example, a conference room where each individual user is likely to aggregate. Then, the information processing system checks whether "Room A" is available for scheduled meeting time, reserves "Room A" if available, and guides the users P, A, B, and C to the "Room A".

The configuration of the information processing system according to the present embodiment and the action support function are described below in detail.

[1.2. System Configuration]

Figure 2:
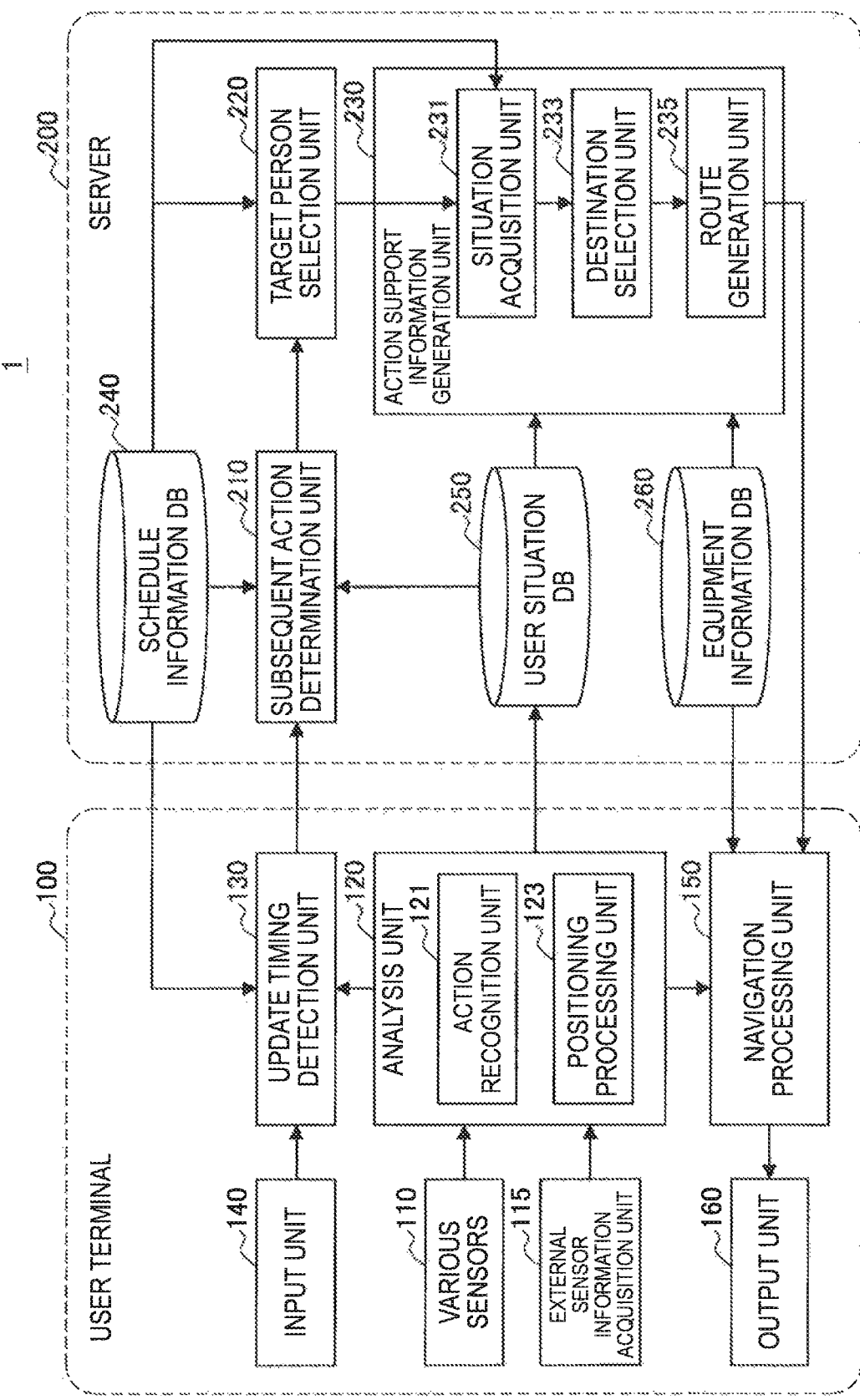
FIG. 2 is a functional block diagram illustrating a configuration example of the information processing system according to the present embodiment.

The functional configuration of an information processing system 1 according to the present embodiment is now described with reference to FIG. 2. Moreover, FIG. 2 is a functional block diagram illustrating a configuration example of the information processing system 1 according to the present embodiment. The information processing system 1 according to the present embodiment is configured to include a user terminal 100 and a server 200, as illustrated in FIG. 2.

(User Terminal)

The user terminal 100 is an information processing terminal such as a mobile terminal carried by a user or a wearable terminal worn by a user. Examples of the mobile terminal include a notebook PC, a tablet terminal, a smartphone, or the like, and examples of the wearable terminal include a wearable terminal device such as glasses, bracelet, or ring type. The user terminal 100 is configured, in one example, to include various sensors 110, an external sensor information acquisition unit 115, an analysis unit 120, an update timing detection unit 130, an input unit 140, a navigation processing unit 150, and an output unit 160, as illustrated in FIG. 2.

The various sensors 110 are detection devices configured to acquire various pieces of information used to recognize the situation of the user who uses the user terminal 100. Examples of the various sensors 110 may include an acceleration sensor, a gyro sensor, a geomagnetic sensor, a pressure sensor, a barometric sensor, a vibration sensor, an illuminance sensor, a temperature sensor, a proximity sensor, or the like. In addition, examples of the various sensors 110 may include global positioning system (GPS) receiver or a positioning sensor such as short-range communication devices using Wi-Fi or the like. Furthermore, examples of the various sensors 110 may include sensors for performing Bluetooth (registered trademark), ultra-wide band (UWB), voice communication (e.g., voice communication in inaudible frequency band), and ultrasonic communication. The detection values acquired by the various sensors 110 are output to the analysis unit 120.

The external sensor information acquisition unit 115 acquires a detection value detected by a sensor installed in equipment inside the building where the user acts (hereinafter also referred to as "external sensor"). The external sensor is installed in, in one example, equipment such as an elevator, a door, and a chair. Examples of the external sensor may include an acceleration sensor, a gyro sensor, a geomagnetic sensor, a pressure sensor, a vibration sensor, an illuminance sensor, a temperature sensor, a proximity sensor, or the like. In addition, examples of the external sensor may include a GPS receiver or a positioning sensor such as a short-range communication device using Wi-Fi or the like. Furthermore, examples of the external sensor may include sensors for performing Bluetooth (registered trademark), ultra-wide band (UWB), voice communication (e.g., voice communication in inaudible frequency band), and ultrasonic communication.

The acquisition of the detection value from the external sensor by the external sensor information acquisition unit 115 makes it possible to detect occurrence of a predetermined operation in equipment on the basis of acceleration, vibration, or the like occurred in the equipment. More specifically, the detection value by the external sensor makes it possible to detect a situation where the elevator moves up or down, the door is opened or closed, and the user is sitting on the chair. This detection may be performed on the basis of a change in acceleration in the direction of gravity applied to the elevator, a change in acceleration or angular velocity applied to the door, an impact applied to the chair, or the like.

Further, in one example, the external sensor may be incorporated in a control circuit of the equipment. The acquisition of the detection value from the external sensor as described above by the external sensor information acquisition unit 115 makes it possible to detect that the equipment is instructed to perform a predetermined operation or that the control for executing the predetermined operation is executed. More specifically, the external sensor may detect control or the like for raising or lowering the elevator. The detection value acquired by the external sensor information acquisition unit 115 is output to the analysis unit 120.

The analysis unit 120 acquires information used to recognize the situation of the user on the basis of the detection value acquired by the various sensors 110 or the external sensor information acquisition unit 115. The analysis unit 120 is configured to include, in one example, an action recognition unit 121 and a positioning processing unit 123.

The action recognition unit 121 refers to an action recognition model and estimates the user's action on the basis of the detection value acquired by the various sensors 110 or the external sensor information acquisition unit 115. The processing of estimating the user's action on the basis of the action recognition model and the sensor detection value can use known action recognition technologies disclosed in many literatures including, in on example, JP 2012-008771A, so detailed description thereof is omitted here.

The positioning processing unit 123 acquires indoor action situation on the basis of the detection value acquired by the various sensors 110 or the external sensor information acquisition unit 115. The positioning processing unit 123 detects that the user passes through the door or leaves the door on the basis of the detection value of the external sensor installed in the indoor equipment.

The information on the action of the user acquired by the analysis unit 120 is output to the update timing detection unit 130 and is recorded in a database of the server 200. Moreover, in the present embodiment, the action recognition unit 121 and the positioning processing unit 123 may execute analysis in cooperation with each other. In one example, the positioning processing unit 123 may acquire the user's action state on the basis of a result obtained by the action estimation that is provided from the action recognition unit 121. In addition, the action recognition unit 121 may recognize the user's action on the basis of a result obtained by the position estimation that is provided from the positioning processing unit 123.

The update timing detection unit 130 detects a timing of determining a subsequent action to support the user's action. In one example, the update timing detection unit 130 may detect the timing of starting the movement of the user, the timing of leaving the room, or the like acquired by the analysis unit 120, and may output an update instruction to determine a subsequent action to support the action to the server 200. In addition, the update timing detection unit 130 may detect a timing at which the end time of a schedule has elapsed on the basis of the schedule information acquired from the server 200, and may output the update instruction to the server 200. Furthermore, the update timing detection unit 130 may output the update instruction to the server 200 on the basis of information input by the user from the input unit 140, which will be described later.

The input unit 140 is a functional unit that receives input information from the user. Examples of the input unit 140 include a keyboard, a button, a lever, a switch, a touch panel, a microphone, and a line-of-sight detection device. The input information that is input to the input unit 140 is used, in one example, as update timing information by the update timing detection unit 130. In one example, when the user operates the input unit 140 to activate an action support application on the user terminal 100, the update timing detection unit 130 may instruct the server 200 to determine a subsequent action that performs action support on the basis of activation of the application.

The navigation processing unit 150 generates information used to navigate the user on the basis of navigation information for the user that is determined by the server 200. In one example, the navigation processing unit 150 performs information processing for presenting navigation information to the user through the output unit 160. The navigation information processed by the navigation processing unit 150 is output to the output unit 160.

The output unit 160 is an information output unit for presenting the navigation information to the user. The output unit 160 may be, in one example, a display unit such as a liquid crystal display or an organic EL display, or a sound output unit such as a loudspeaker.

Moreover, although the user terminal 100 according to the present embodiment is described as having all the functions of the user terminal 100 described above as illustrated in FIG. 2, the present disclosure is not limited to this example. In one example, the functional units of the user terminal 100 described above may be provided separately in a plurality of devices that can communicate. Alternatively, in one example, the analysis unit 120, the update timing detection unit 130, or the like may be provided in the server 200, which will be described later.

(Server)

The server 200 determines a subsequent schedule to perform the action support, and generates navigation information to be presented to the target user of the action support on the basis of the instruction from the user terminal 100. The server 200 is configured to include, in one example, a subsequent action determination unit 210, a target person selection unit 220, an action support information generation unit 230, a schedule information DB 240, a user situation DB 250, and an equipment information DB 260, as illustrated in FIG. 2

The subsequent action determination unit 210 receives an update instruction from the user terminal 100 to determine the subsequent action to perform the user's action support. In one example, the subsequent action determination unit 210 may determine the subsequent action on the basis of the schedule information recorded in the schedule information DB 240, and may determine the subsequent action from a user's previous action, position, and state pattern recorded in the user situation DB 250. The subsequent action determination unit 210, when determining the subsequent action to perform the action support, notifies the target person selection unit 220 of information on the determined action.

The target person selection unit 220 selects a target user who is to perform the action support. In one example, the target person selection unit 220 may specify a user who is scheduled to perform the subsequent action to perform the action support and may set the specified user as the target user on the basis of the schedule information recorded in the schedule information DB 240. In addition, the target person selection unit 220 may set, as the target user, a user who is predicted to perform the subsequent action to perform the action support from the user's previous action, position, and state pattern recorded in the user situation DB 250. The target person selection unit 220, when selecting the target user to perform the action support, notifies the action support information generation unit 230 of the target user.

The action support information generation unit 230 generates information used to support the subsequent action to the target user. The action support information generation unit 230 is configured to include, in one example, a situation acquisition unit 231, a destination selection unit 233, and a route generation unit 235.

The situation acquisition unit 231 acquires the current action, position, and state of the target user. In one example, the situation acquisition unit 231 may acquire action recognition information or a positioning location acquired by the user terminal 100 of each target user, or may acquire the user's current action, position, and state on the basis of the schedule information registered in the schedule information DB 240. Alternatively, the situation acquisition unit 231 may estimate a user's current situation from the user's previous action, position, and state pattern recorded in the user situation DB 250.

The destination selection unit 233 selects a destination of the subsequent action on the basis of the current situation of each target user that is acquired by the situation acquisition unit 231. The destination selection unit 233 refers to map information of the equipment such as the floor map or equipment information of the facility such as a conference room, which is recorded in the equipment information DB 260, and automatically sets an optimal destination from the current situation of the target user. Specifically, in one example, equipment such as a conference room located substantially at the center of the current position of each target user is selected as the destination to which each target user can easily aggregate from the current positions of the plurality of target users.

The route generation unit 235 generates a route leading to the destination to be presented to the target user. The route generation unit 235 generates one or a plurality of routes from the current position of each target user to the destination selected by the destination selection unit 233. In this case, the route generation unit 235 may generate a route to be presented to the target user in consideration of the current position of another target user, action tendency of the user, a schedule following to the subsequent action, or the like. One or a plurality of routes generated by the route generation unit 235 are output to the user terminal 100 for presenting them to the user.

The schedule information DB 240 stores schedule information of the user. In the schedule information DB 240, schedule information that is input by the user through various information processing terminals such as a computer, a mobile terminal, a wearable terminal, or the like are collected. Examples of the schedule information include details of schedule, start time, end time, place, or the like.

The user situation DB 250 stores the user's action, position, and state acquired by the analysis unit 120 of the user terminal 100. The user situation DB 250 may store the user's action, position, and state in time-series order in association with the acquisition time.

The equipment information DB 260 stores the map information or equipment information of indoor facilities where the user acts. In one example, a floor map of each floor of the building of a company to which a user works, equipment use information representing the use status of equipment such as a conference room, or the like is stored. Examples of the equipment use information include scheduled use time, purpose of use, or the like, as a reservation for use of the equipment.

Moreover, although the server 200 according to the present embodiment is described above as having all the functions of the server 200 illustrated in FIG. 2, the present disclosure is not limited to this example. In one example, the functional units of the server 200 described above may be provided separately in a plurality of servers that can communicate.

[1.3. Action Support Processing]

An action support processing by the information processing system 1 according to the present embodiment is now described with reference to the flowchart illustrated in FIG. 3. Moreover, in the user terminal 100, it is assumed that the various sensors 110 perform sensing in normal conditions, and the detection value of the external sensor is acquired in normal conditions by the external sensor information acquisition unit 115. The analysis unit 120 recognizes the user's action or measures the user's position on the basis of the detection value.

(Update Timing Detection)

In the action support processing according to the present embodiment, first, the update timing detection unit 130 of the user terminal 100 detects a timing of determining the subsequent action to support the user's action (S100). The update timing detection unit 130, when detecting an update trigger for updating the action of the target to support, determines that it is the timing to update the action to perform the action support, and causes the server 200 to determine the subsequent action to perform the action support.

The update timing may be, in one example, a case where the user performs a predetermined action that is set as an update trigger from the user's action, position, and state acquired by the analysis unit 120. It is conceivable that an example of the predetermined action that can be set as the update trigger includes a case where the user starts to move or the user leaves the room.

The movement start of the user can be recognized using a detection value of an inertial sensor, for example, an acceleration sensor, a gyro sensor, a barometric sensor, or the like. Specifically, the movement starts can be recognized as a case of detecting a predetermined time (or predetermined number of times) of walking from the acceleration sensor of the user terminal 100. Alternatively, the seat position of the user may be specified from the detection value of the acceleration sensor, the gyro sensor, and the barometric sensor, and the case where the movement is started may be recognized by a change in the posture of the standing position.

Further, the movement start of the user can also be recognized by detecting that the user leaves the seat by a positioning sensor such as an infrared sensor, RFID, BLE, Wi-Fi, or the like installed indoors. Furthermore, the movement start of the user can be recognized by determining that the user stands up from the seat or leaves the seat using image recognition from the projected image captured by a camera installed indoors. Alternatively, the movement start of the user can be recognized by determining that the user stands up from the seat or leaves the seat using a self-position estimation technique based on an image, such as SLAM, from the projected image captured by a camera provided in the user terminal 100.

Moreover, the processing of determining that the movement start of the user is performed in parallel and the final determination of whether the user starts to move is performed by combining a plurality of results obtained by the determination, and so it is possible to more accurately determine whether the user starts to move.

The case where the user leaves the room can also be determined on the basis of the information acquired by an inertial sensor, a positioning sensor, a camera, or the like in a similar way to the determination of the movement start of the user. In one example, the case where the user leaves the room can be detected by recognizing that the user goes outside the room using pedestrian dead reckoning (PDR) on the basis of the detection value of the acceleration sensor, the gyro sensor, and the geomagnetic sensor which are inertial sensors mounted on the user terminal 100. In addition, in a case where the initial position of the user is known, it is also possible to determine that the user leaves the room on the basis of the moving direction, moving distance, or the like from the user's position. On the other hand, in a case where the user's initial position is unknown, it may be determined, on the basis of preset constraint condition such as the size and structure of the room, that the user leaves the room if the user's position estimated from the user's moving direction, moving distance, or the like excesses the constraint condition. Furthermore, it may be recognized by the vibration sensor installed in the door or the mat of the room that the user goes outside the room by passing through the door and it may be determined that the user leaves the room.

Further, the case where the user leaves the room can be recognized by detecting that the user passes through the door using a positioning sensor such as an infrared sensor, RFID, BLE, Wi-Fi, or the like installed indoors. Furthermore, the case where the user leaves the room can be recognized, using image recognition, that the user passes through the door from the projected image that is captured by the camera installed inside the room. Alternatively, the case where the user leaves the room can be recognized by determining that the user passes through the door using the self-position estimation technique based on an image, such as SLAM, from the projected image that is captured by the camera provided in the user terminal 100.

Moreover, the processing of determining that the case where the user leaves the room is performed in parallel and the final determination of whether the user leaves from the room is performed by combining a plurality of results obtained by the determination, and so it is possible to more accurately determine that the user leaves the room.

The update timing detected by the update timing detection unit 130 may be, in one example, timing when it is detected that the end time of a user's schedule registered in the schedule information DB 240 of the server 200 has elapsed in addition to those described above. Alternatively, the update timing may be timing when the user activates the action support application by operating the input unit 140. If it is determined in step S100 that the update timing is reached, the user terminal 100 outputs an update instruction to the server 200 so that the server 200 determines the subsequent action to perform the action support.

(Determination of Subsequent Action)

When the server 200 receives the update instruction from the user terminal 100, the subsequent action determination unit 210 determines the subsequent action to support the user's action (S110). In step S110, in one example, the user checks the subsequent conference or meeting to attend, and if there is the conference or the like where the user attends, it is determined to support the user's action until attending the conference. The subsequent action to perform the action support may be determined from the schedule information registered in the schedule information DB 240, in one example, or may be determined by prediction from the user's previous action, position, and state pattern.

Figure 4:
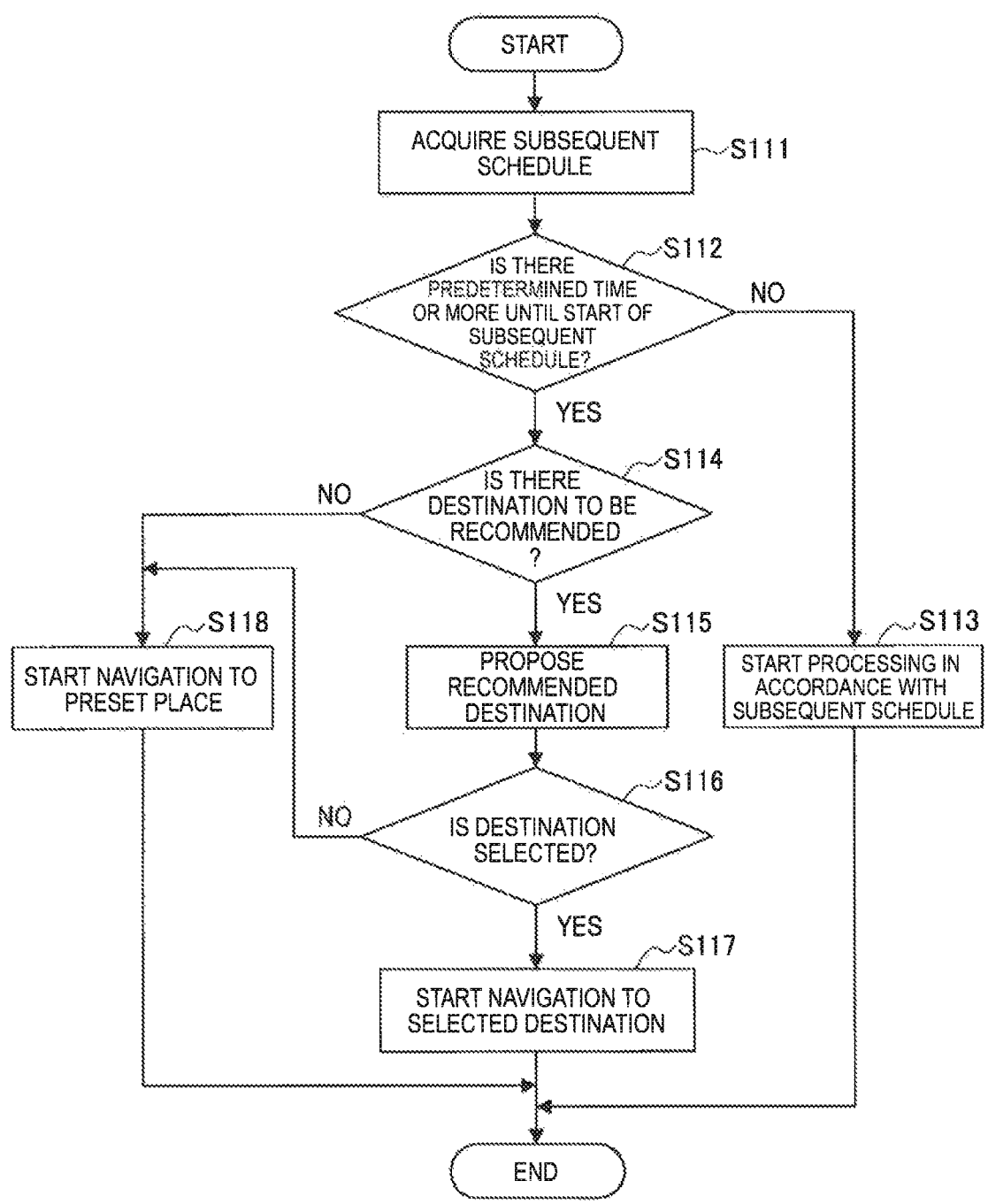
FIG. 4 is a flowchart illustrating processing in a case where a subsequent action to perform action support is determined on the basis of schedule information in step S110 of FIG. 3.

First, with reference to FIG. 4, processing in the case of determining the subsequent action to perform the action support on the basis of the schedule information is described. The subsequent action determination unit 210 refers to the schedule information DB 240 to acquire the subsequent schedule from the current time (S111) as illustrated in FIG. 4. Then, the subsequent action determination unit 210 determines whether the idle time to the start time of the schedule acquired from the current time is equal to or longer than a predetermined time (S112). In this step, it is assumed that the predetermined time compared with the idle time takes into consideration of the user's movement time to the place held in accordance with the schedule. This movement time may be an estimated movement time obtained by estimating time from the user's current position to the place currently registered in the schedule information, or may be a preset fixed time.

In the case where the idle time is less than the predetermined time in step S112, the server 200 sets the schedule acquired in step S111 as the subsequent action to perform the action support, and starts the action support processing in accordance with the schedule (S113). Specifically, the processing from step S120 in FIG. 3 is executed on the subsequent schedule. On the other hand, in the case where the idle time is equal to or longer than the predetermined time, it is early to perform the action support for the subsequent schedule, so the schedule acquired in step S111 is not the subsequent action to perform the action support, and there is no subsequent schedule.

If it is determined that there is no subsequent one, in one example, the subsequent action determination unit 210 may instruct the user terminal 100 to notify the user that there is no subsequent schedule. Alternatively, the action support such as action proposal that can utilize the idle time until the subsequent schedule may be started. In one example, as illustrated in FIG. 4, if there is a recommended destination as a place where the user can wait until the subsequent schedule, the destination may be proposed to the user. The recommended destination candidate is stored, in one example, in a storage unit (not shown) of the server 200 or an external server. Examples of the destination candidate include a rest room, a dining room, a cafeteria, or the like, and it is associated with the floor map of equipment, equipment information, or the like stored in the equipment information DB 260.

In one example, the subsequent action determination unit 210 may determine the destination to be proposed to the user from the destination candidates in consideration of the user's current position, the place scheduled to be held in accordance with the subsequent schedule, the current time, the length of the idle time, the user's previous action tendency, or the like. Specifically, in one example, if the current time is lunchtime, the subsequent action determination unit 210 may set a dining room or a cafeteria as the destination to be proposed to the user. Alternatively, the subsequent action determination unit 210 may set, as the destination to be proposed to the user, a destination candidate closest to the user's current position, a destination candidate selected previously by the user, or a destination candidate on the route from the user's current position to the place scheduled to be held in accordance with the subsequent schedule.

The subsequent action determination unit 210 determines whether there is a destination candidate that can be recommended to the user as described above (S114). If there is a recommended destination candidate, the subsequent action determination unit 210 proposes the destination candidate recommended to the user through the user terminal 100 (S115). Then, the subsequent action determination unit 210 determines whether the user selects the proposed destination candidate (S116). If the destination candidate is selected, the subsequent action determination unit 210 sets the destination candidate as the destination, and determines to guide the user to the destination (S117). On the other hand, in a case where the recommended destination fails to be found in step S114 or a case where the user does not select the proposed destination in step S116, it is determined to guide the user to a destination that is a preset place set in advance (S118). The prescribed place may be, in one example, an own seat, an own room, or the like.

Figure 3:
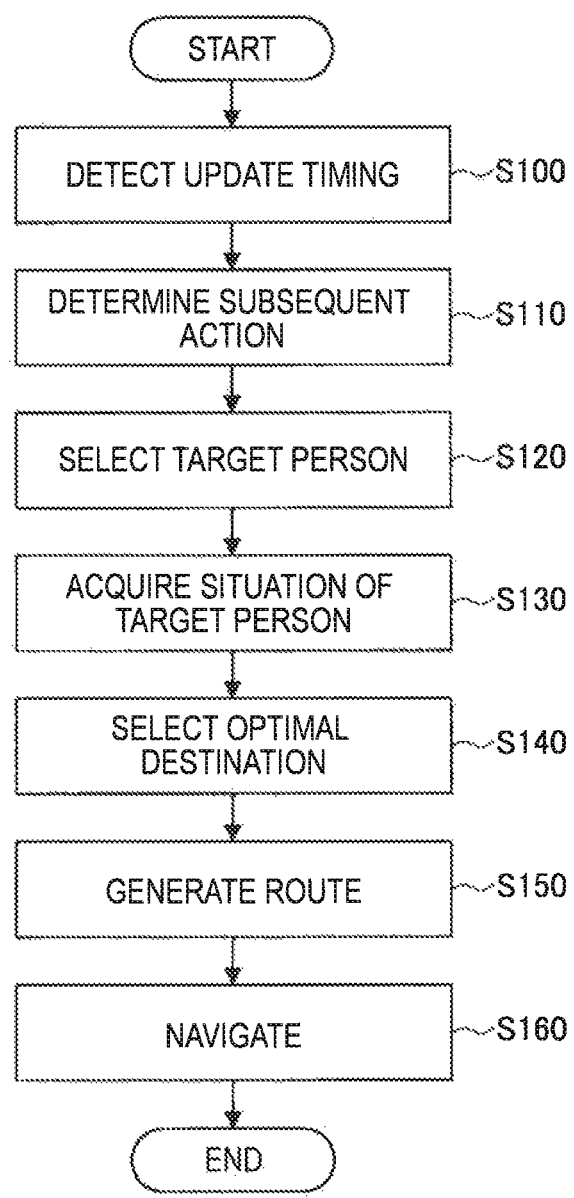
FIG. 3 is a flowchart illustrating action support processing by the information processing system according to the present embodiment.

Moreover, the processing in steps S115 and S118 and the subsequent steps may be performed in the similar way to step S120 in FIG. 3 by setting only the user concerned as the target user who performs the action support. The processing in step S120 and subsequent steps in FIG. 3 will be described later, but details of the processing in steps S115 and S118 and the subsequent steps in FIG. 4 are omitted. In this way, in the case where the idle time until the subsequent schedule is long, it is possible for the user to act efficiently by proposing the place or action to spend the idle time.

Next, there is described in step S120 a case where the prediction is performed from the user's previous action, position, and state pattern and the subsequent action is determined. In one example, it is assumed that a schedule to perform the action support by the information processing system 1 according to the present embodiment is a conference or meeting. In this case, in one example, the subsequent action determination unit 210 may predict the subsequent schedule on the basis of information on the conference the user attended in the past and the user's previous action, position, and state pattern recorded in the user situation DB 250. The information on the conference the user attended in the past includes, in one example, information such as date and time, day of week, place, attendee, or the like of the conference. In one example, the information may be information manually entered by the user or may be information automatically recorded.

In one example, the subsequent action determination unit 210 may predict the subsequent conference or meeting from the time information (e.g., day of month, day of week, and time of day) of the conference the user attended in the past. This prediction makes it possible to extract a conference or the like which is regularly held, such as "Conference A at 1 p.m. on every Wednesday" or the like, and to perform the subsequent action.

Further, the subsequent action determination unit 210 may predict the subsequent conference or meeting, in one example, from the time-series order of the conference the user attended in the past. This prediction makes it possible to extract the conference or the like to be held continuously, such as "Conference B is held after conference A" or the like, and to perform the subsequent action.

Furthermore, the subsequent action determination unit 210 may predict the subsequent conference or meeting, in one example, from the place of the conference where the user attended in the past. This prediction makes it possible to extract a pattern in which the user moves to the conference room, such as "Move to conference room YYY after conference room XXX" or the like, and to perform the subsequent action.

Further, the subsequent action determination unit 210 may predict the subsequent conference or meeting, in one example, from attendees of the conference the user attended in the past. This prediction makes it possible to extract a pattern related to other users who conduct a conference or the like with the user, such as "Report to C after conference with A and B" or the like, and to perform the subsequent action.

(Selection of Target Person)

Referring back to the description of FIG. 3, if the subsequent action determination unit 210 determines the subsequent action to perform the action support, the target person selection unit 220 selects a target user to be subject to the action support by the information processing system 1 (S120). In one example, the target person selection unit 220 selects a user who participates in a conference or meeting determined as the subsequent schedule as the target user. The target user 26 may be determined on the basis of the schedule information of a user, or may be determined by extracting the user who registers the schedule determined in step S110 from the schedule information of a plurality of users recorded in the schedule information DB 240.

Further, the target person selection unit 220 may refer to the user situation DB 250 and may select the target user on the basis of the user's previous action, position, and state pattern. In this event, in one example, the target person selection unit 220 may predict a participant to the subsequent schedule on the basis of information on the conference the user attended in the past and the user's previous action, position, and state pattern recorded in the user situation DB 250. The information on the conference the user attended in the past may be information manually entered by the user or may be information automatically recorded, as described above.

In one example, the target person selection unit 220 may predict a participant to the subsequent conference or meeting from the time information (e.g., day of month, day of week, and time of day) of the conference the user attended in the past. This prediction makes it possible to extract a participant attending regularly held conferences or the like, such as "Conference A at 1 p.m. on every Wednesday and participants are a, b, and c" or the like, and to set the participant as the target user.

Further, in one example, the target person selection unit 220 may predict a participant to the subsequent conference or meeting from the time-series order of the conferences the user attended in the past. This prediction makes it possible to extract a participant who attends the conference to be held continuously, such as "Participants of conference B held after conference A are a, b, and c" or the like.

Furthermore, the target person selection unit 220 may predict a participant in the subsequent conference or meeting, in one example, from the place of the conference where the user attended in the past. This prediction makes it possible to extract a pattern in which the user moves to the conference room, such as "Move to conference room YYY after conference room XXX and conference is being held with participants of a, b, and c" or the like, and to set a user who participates in the conference or the like at the place as the target user.

Further, the target person selection unit 220 may predict a participant to the subsequent conference or meeting, in one example, from the attendees of the conference the user attended in the past. This prediction makes it possible to extract a pattern related to other users who conduct a conference or the like with the user, such as "Report to C together with participants a, b, and c after conference with A and B" or the like, and to perform the subsequent action, or the like, and to select the target user.

(Acquisition of Situation of Target Person)

If the target user is selected in step S120, the situation acquisition unit 231 of the action support information generation unit 230 acquires the current situation of each target user (S130). The situation acquisition unit 231 may acquire action recognition or a positioning position analyzed by the user terminal 100 with reference to the user situation DB 250 for each target user, or may acquire the registered schedule information with reference to the schedule information DB 240.

Alternatively, the situation acquisition unit 231 may refer to the user situation DB 250 and acquire the current situation of each target user on the basis of the user's previous action, position, and state pattern. In one example, the situation acquisition unit 231 may predict the current situation of the target user from time information (e.g., day of month, day of week, and time of day). This prediction makes it possible to acquire the current action of the target user in association with the conference or the like that is regularly held, such as "Conference A ends at 1 p.m. every Wednesday and target user a is moving by walking" or the like.

Further, the situation acquisition unit 231 may predict the current situation of the target user, in one example, from the time-series order of the conference. This prediction makes it possible to acquire the current action of the target user, such as "Target user a is moving by walking to attend conference B after conference A" or the like.

Furthermore, the situation acquisition unit 231 may predict the current situation of the target user, in one example, from the conference place. This prediction makes it is possible to acquire the current action of the target user from a pattern in which the user moves to the conference room, such as "Target user a is moving by walking to conference room YYY after use of conference room XXX" or the like.

Further, in one example, the situation acquisition unit 231 may predict the current situation of the target user from attendees at the previous time. This prediction makes it possible to acquire the current action of the target user from a pattern relating to other users who conduct the conference or the like with the user, such as "Target user a is moving by running after conference with A and B", or the like.

(Selection of Destination)

If the current situation of each target user is acquired, the destination selection unit 233 selects the optimal destination for each target user (S140). In one example, in a case where the subsequent schedule is a conference, the destination selection unit 233 selects an optimal conference room on the basis of the current position of each target user from a plurality of conference rooms in the facility.

In one example, when a conference attended by the target users A, B, C, and P is selected as the subsequent schedule, the destination selection unit 233 selects an optimal conference room from the current position of each of the target users A, B, C, and P that is acquired in step S130. Here, assume that the target users A, B, C, and P are on a floor as illustrated in FIG. 1. In this event, the destination selection unit 233 may select a conference room in which the relative distance sum ΣXxy between the target users A, B, C, and P at a certain time and the conference rooms ("Room A", "Room B", "Room C", and "Room D") is the minimized as the destination. The relative distance between each target user and each conference room is represented by Xxy (x=a–d, y=a–d) as illustrated in FIG. 5, in one example. In the example of FIG. 1, the conference room "Room Y" is selected as the destination.

Further, the destination selection unit 233 weights the destination selection for each target user or for each conference room, and selects a conference room with the relative distance sum between each target user and the conference room is minimized as the destination.

In other words, a conference room in which the relative distance sum ΣWxXxy obtained by multiplying the relative distance Xxy between the target user and the conference room by the weighting Wx that is set for each target user is minimized may be selected as the object. In the example of FIG. 1, a conference room "Room Y" in which the relative distance sum ΣWxXxy is minimized is selected as the destination.

Here, the weighting Wx is, in one example, a weighting value obtained by incorporating the current busyness of the user, the type of the current action, or the like. The busyness of the user may be represented by, in one example, the conference duration until now or conference duration from now estimated from the contents of the schedule, or the current stress degree of the user that is estimated from a biological information measuring sensor (e.g., heart rate RRI). In addition, the busyness of the user may be represented by, in one example, the accumulated activity amount or total step count of the user until now calculated from acceleration sensor, pedometer, activity monitor, or the like, the total utterance amount until now acquired by the microphone, the number of specific keywords included in the utterance contents, the degree of fatigue determined from the frequency characteristics of voice, or the like.

Further, in a case of setting the weighting Wx from the action type of the user, in one example, the weighting Wx may be set on the basis of the user's posture. As a specific example, the weighting Wx may be set depending on whether the user's posture is close to or far from the walking state. In this event, assuming that the movement time to the destination is longer as the user's posture is far from the walking state, in one example, the weighting Wx may be set to 1.0 for the sitting position, 0.5 for the standing position, and 0.1 for the walking. In addition, as another specific example, the weighting Wx may be set on the basis of the average speed of a moving means of the user. In one example, the weighting Wx may be set such that the movement by walking is 1.0, the movement by running is 0.5, and the movement by the standing electric motorcycle is 0.1. In addition, in one example, the weighting Wx may be set such that the movement at the stairs is 1.0, the movement at the escalator is 0.5, and the movement at the high-speed elevator is 0.1.

Alternatively, a conference room in which the relative distance sum WyΣXxy obtained by multiplying the relative distance Xxy between the target user and the conference room by the weighting Wy that is set for each conference room is minimized may be selected as the object. In the example of FIG. 1, the conference room "Room Y" where the relative distance sum WyΣXxy is minimized is selected as the destination.

In this regard, the weighting Wy is, in one example, a weighting value obtained by incorporating the comfort and convenience of the conference room. The comfort of the conference room is represented by, in one example, the temperature, humidity, and smell of the conference room that are acquired by an environment-installed sensor or the like, the number of participants in the conference that was held just before, the type or quality of equipment of the conference room facilities, maintenance status, or the like.
(Generation of Route)

Figure 6:
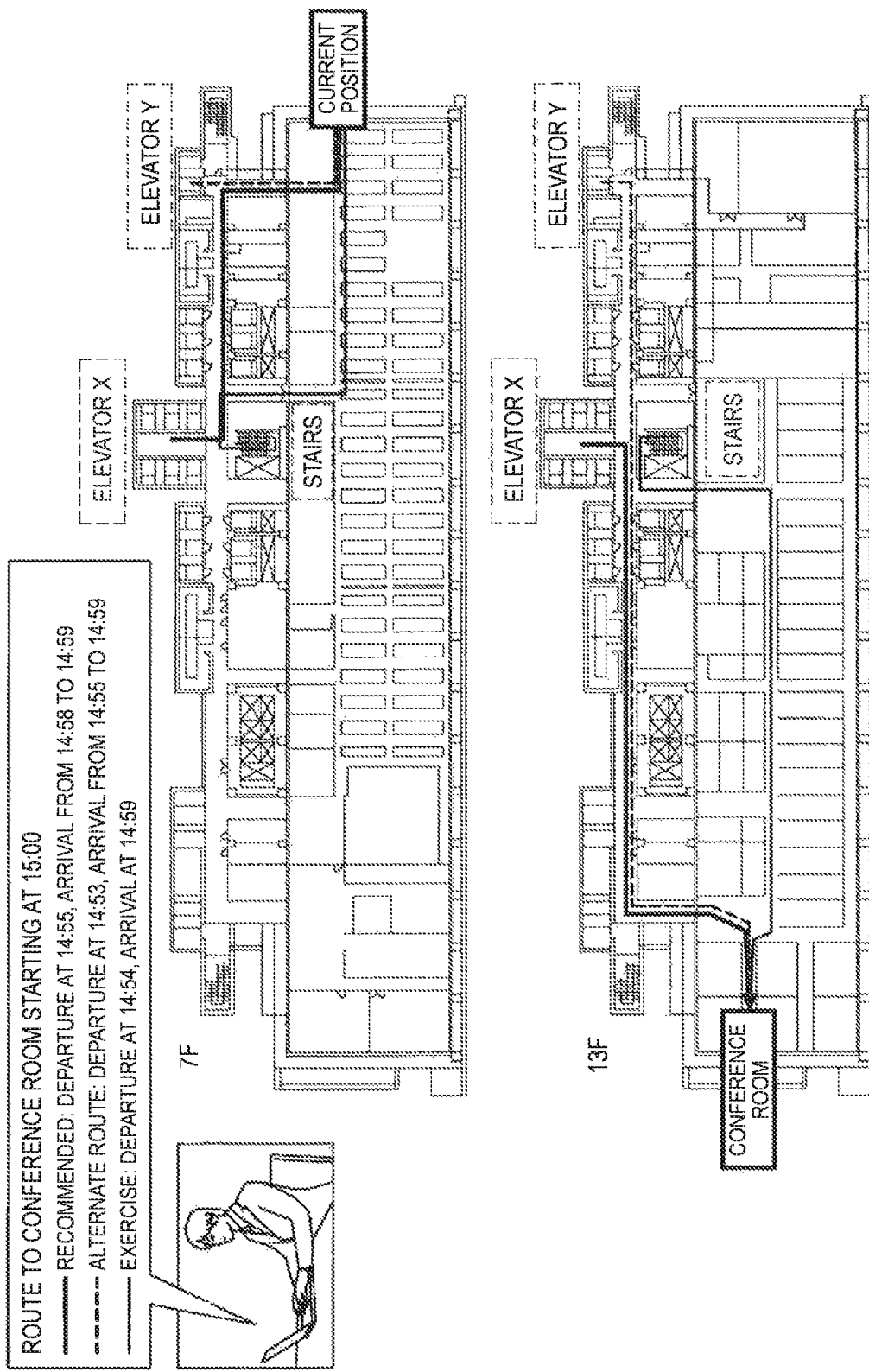
FIG. 6 is a diagram illustrated to describe an example of a candidate for a route.

If the target user and the destination are selected, the route generation unit 235 generates one or more routes for guiding each target user to the destination (S150). In one example, as illustrated in FIG. 6, consider a case of guiding a target user on the seventh floor to a conference room on the 13th floor. In this event, the route generation unit 235 creates a route where the target user can move efficiently, a route frequently used by the target user, or the like, in one example, on the basis of a mixed situation at each position in the indoor, a movement history of the target user, or the like.

More specifically, in the example illustrated in FIG. 6, three routes of a recommended route, an alternate route, and an exercise route are proposed. The recommended route is a route that is considered optimal and is generated by predicting the degree of congestion or the like in the indoor in conjunction with the schedule of each office worker. In FIG. 6, the movement between the floors using the elevator X is proposed as the proposed route. In addition, the alternate route is a route generated from a viewpoint different from the recommended route. In one example, it may be a route for performing inter-floor movement using the moving means located closest to the current position of the target user, or may be a route frequently used by the user from movement history or the like. In FIG. 6, a route using the elevator Y closest to the current position of the user is proposed as the alternate route. Furthermore, the exercise route is a route in which the stairs are preferentially used or the travel distance is set longer than the recommended route. In FIG. 6, a route that moves between the floors using the stairs is proposed as the exercise route.

Further, the route generation unit 235 may generate a route in which a toilet or vending machine is set as an intermediate destination during the user's movement from the user's current position to the destination. The intermediate destination may be planned previously, or may be set by automatically recognizing the time taken to the intermediate destination, the frequency of use, the usage tendency of the user, or the like from the user's previous action history. In one example, in a case where there is an action tendency such as "Buying a drink at a vending machine on the way from the conference room A to the conference room B", the route generation unit 235 may propose a route passing through the vending machine when the user is guided from the conference room A to the conference room B.

The route generation unit 235 generates at least one route. The type of routes to be generated may be determined on the basis of information set in advance by the user or may be determined by estimation from the user's action history or the like. The route generation unit 235 may calculate an action start time at which movement starts from the current position, an expected arrival time to the destination, or the like, in conjunction with the route to be presented.

Further, in the route generation example described above, it is assumed that each target user acts as one person, but the target user may act together with other users in some cases. In one example, it is conceivable that the user is acting together with someone before the subsequent schedule, or joining another target user in the middle and moving to the destination. Thus, the route generation unit 235 may generate a route in consideration of actions by a plurality of users.

In one example, consider a case where the target user is acting together with someone before the subsequent schedule. A person who is acting together with the target user is a person who does not participate in the subsequent schedule. In this event, in one example, the route generation unit 235 may generate a route to the destination of the subsequent schedule depending on the degree of intimacy between the target user and this person. In one example, a route to be generated may be determined by comparing the priority with the shortest route depending on the degree of intimacy between users.

The degree of intimacy between users may be estimated, in one example, from business relations. The business relationship between users is information that can be acquired in cooperation with, in one example, a task management tool. Alternatively, the degree of intimacy between users may be estimated from the number of attendances at past conferences, the friend registration status of SNS, and the frequency of direct messages. Furthermore, the degree of intimacy may be determined by estimating the feeling of tension or the degree of stress of the target user from the frequency characteristic analysis result of the voice uttered by the target user that is acquired through the microphone of the user terminal 100, the heart rate detected by a heartbeat sensor, or the like.

In a case where the degree of intimacy between users is higher than a predetermined threshold, the route generation unit 235 may generate a route such that the distance from the current position to a branch point where each person heads to the subsequent schedule is made as long as possible rather than the shortest route. On the other hand, in a case where the degree of intimacy between users is not so high and it is lower than the predetermined threshold, the route generation unit 235 may generate the shortest route preferentially.

Further, in one example, in a case where another target user who participates in the subsequent schedule is near the present position or there is a tendency to go along with the schedule, a route where a user joins another target user on the way and moves to the destination may be generated. In this event, in one example, the route generation unit 235 refers to the candidate route to be presented to other target user and may generate a route that allows the target user to join with other target user at the shortest time before arriving at the destination. Alternatively, the route generation unit 235, when recognizing that the other target user has not yet started moving, may generate a route that passes through the current position of the other target user.
(Navigation)

Figure 7:
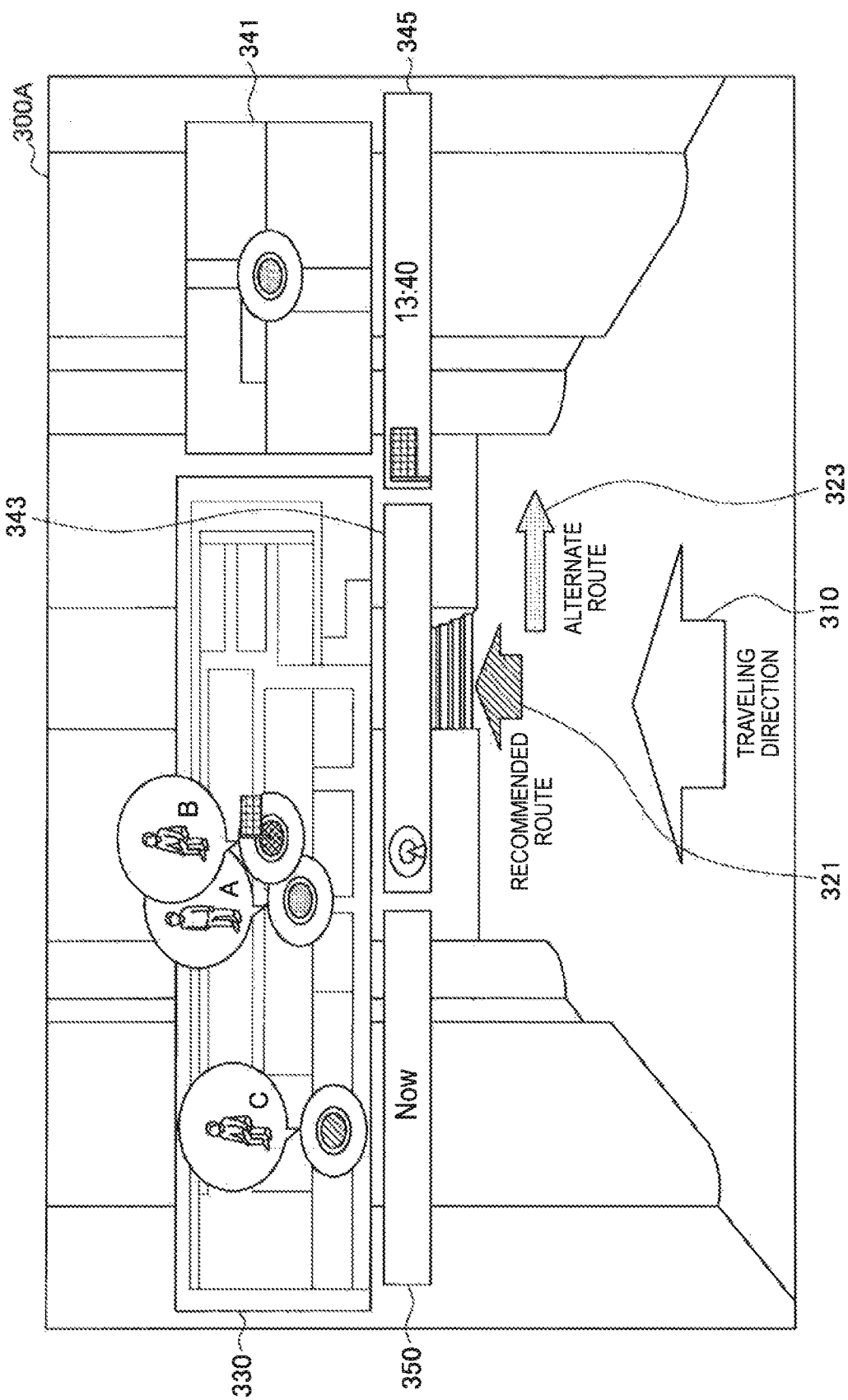
FIG. 7 is a diagram illustrated to describe an example of a route presented to a target user by an eyewear terminal.
Figure 8:
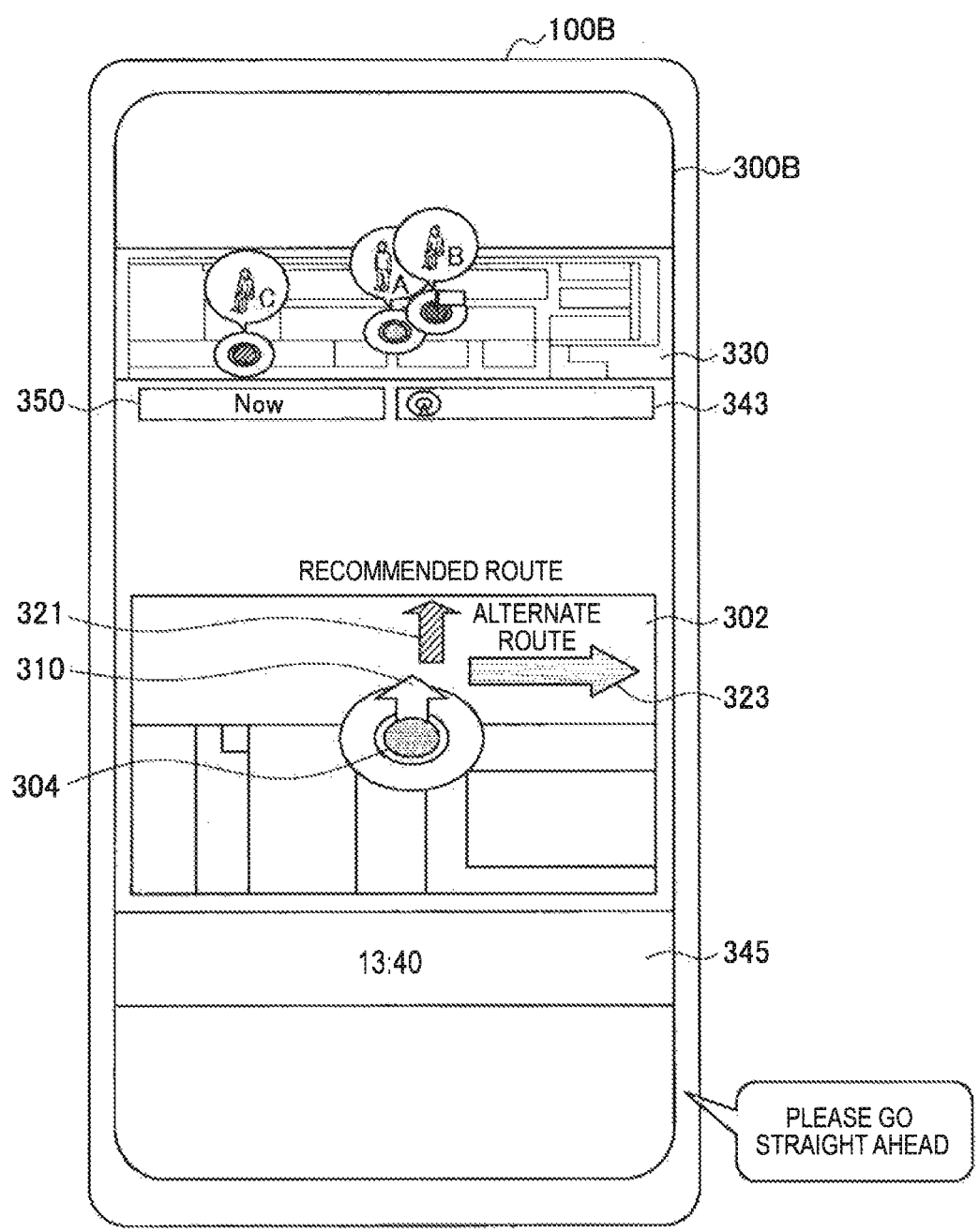
FIG. 8 is a diagram illustrated to describe an example of a route presented to a target user by a smartphone.
Figure 9:
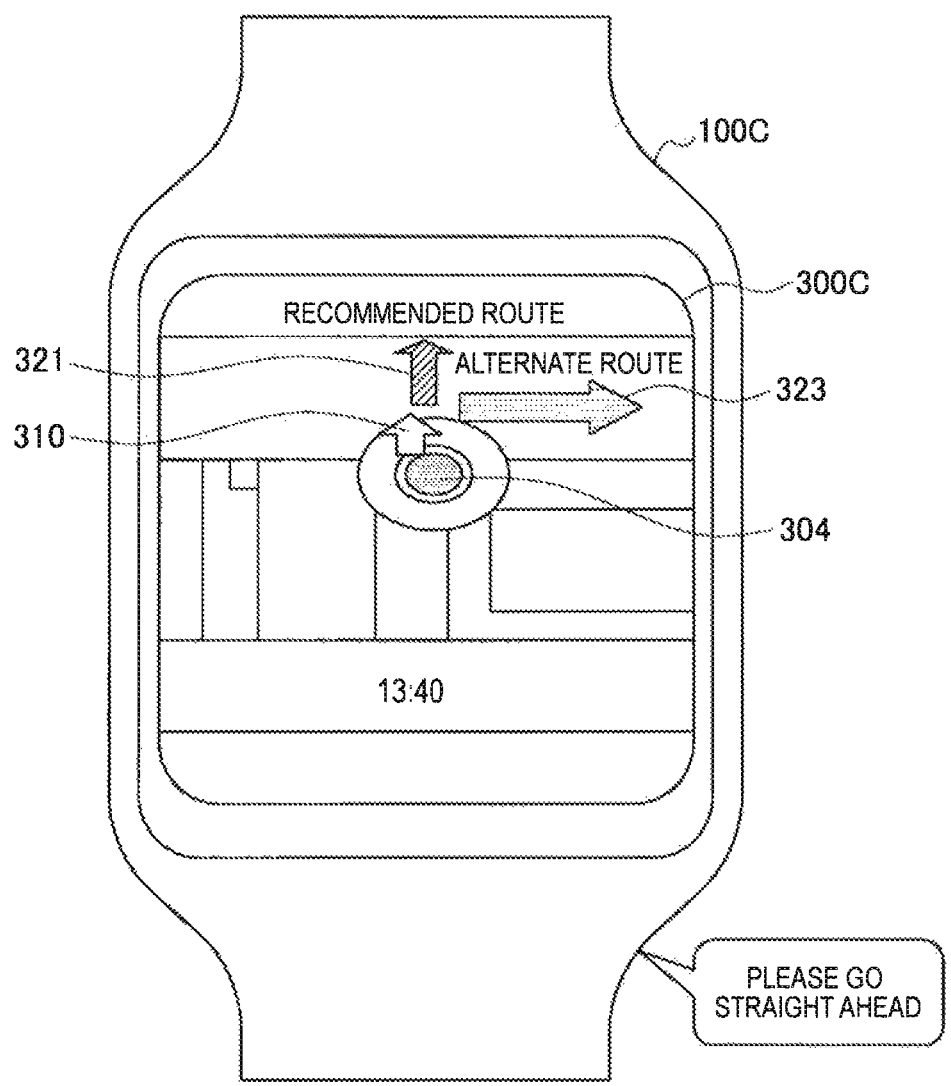
FIG. 9 is a diagram illustrated to describe an example of a route presented to a target user by a wristband type terminal.

One or a plurality of candidate routes generated by the route generation unit 235 are transmitted to the user terminal 100 and are subject to display processing or the like by the navigation processing unit 150, and then presented to the target user through the output unit 160. The target user starts moving to the destination while referring to the presented route. FIGS. 7 to 9 illustrate an example of route presentation to the target user.

(a) Eyewear Terminal

FIG. 7 illustrates an example of route presentation in a case where the target user is using an eyewear terminal. FIG. 7 is an example of a screen 300A being viewed by the target user who wears the eyewear terminal. The screen 300A shows the external environment that can be recognized by the target user at the current position. In other words, if the eyewear terminal is an immersive HMD, the captured image of the external environment is displayed in see-through mode on the screen 300A. If the eyewear terminal is an eyeglass type terminal, a scouter, or the like, the external environment can be viewed through the lens. Then, as described below, the route guidance to the target user, the notification of the situation of other target users, or the like is performed using the augmented reality (AR) technology.

Assume that a target user P who wears this eyewear terminal and other target users A, B, and C participate in the subsequent schedule. In this event, an object 310 indicating the traveling direction of the target user P and route display objects 321 and 323 displaying the route generated by the route generation unit 325 are displayed on the screen 300A. Although the shapes of these objects 310, 321, and 323 are not limited, the use of the shape of an arrow as illustrated in FIG. 7 makes it possible for the target user P to recognize easily the traveling direction. In addition, as illustrated in FIG. 7, the text describing the contents of the object may also be displayed together.

Furthermore, the route may be guided to the target user by voice using a loudspeaker or the like provided in the eyewear terminal. In the case where information can be presented to the target user by voice, in one example, the situation of other participants may be explained. Specifically, in one example, the situation of other target users may be periodically notified, such as "A will arrive in XX minutes", or the situation of another target user may be notified at the timing when A arrived, such as "A has already arrived at the conference room".

Further, depending on the situation of other target user, the type and pitch of the music being heard by the target user may be changed, and the action to be taken by the target user may be expressed by the impression of the music. Specifically, in one example, if no one has arrived at the destination yet, the relaxing music is played, but if there is at least one person who has already arrived, the music is played by raising the pitch of the music a little. Then, if all the others have already arrived, the pitch of the music may be further raised to hasten the target user, or the alert sound may be superimposed on or switched to the playing music. This makes it possible to perform sensory notification of whether the target user is necessary to hurry.

Further, a map display area 330 in which the entire map including the floor where the destination exists is displayed may be displayed on the screen 300A. The current positions of other target users A, B, and C may be displayed on the map display area 330. This makes it possible for the target user P to recognize the aggregation situation of participants in the subsequent schedule. In this event, the situation of other target users A, B, and C may be made recognizable by icons. In one example, in FIG. 7, the target user A is displayed as an icon where a person stands, so it can be seen that the target user A is moving. The target user B is displayed as an icon where a person is at the destination, so it can be seen that the target user B arrives at the destination. In addition, the target user A is displayed as an icon where a person is sitting at a position that is not the destination, so it can be seen that the target user C has not started moving yet.

Furthermore, a position display area 341 displayed around the current position of other target user (hereinafter also referred to as "subject target user") subject to the target user P may be displayed on the screen 300A. In addition, a subject target display area 343 for notifying the subject target user or a subject target scheduled arrival time display area 345 for displaying the scheduled time at which the subject target user arrives at the destination may be displayed on the screen 300A. This makes it possible for the target user P to recognize detailed information on the situation of a particular other target user. In one example, it is possible to know the scheduled arrival time of the target user who is late in the conference time.

Further, an information acquisition time display area 350 indicating the acquisition time of information displayed in the display area 330, the position display area 341, the subject target display area 343, and the subject target estimated arrival time display area 345 is displayed on the screen 300A. In the example of FIG. 7, it can be seen that the situation of the other target users A, B, and C at this moment is displayed in each of the display areas.

(b) Smartphone

Next, an example of route presentation in the case where the target user is using a smartphone 100B is illustrated in FIG. 8. FIG. 8 illustrates an example of a screen 300B viewed by the target user who wears the smartphone 100B. The route guidance to the target user, notification of the situation of other target users, and the like are also performed on the screen 300B, which is similar to the screen 300A of FIG. 7.

In one example, as illustrated in FIG. 8, a route presentation area 302 for performing route guidance to the target user P is displayed on the screen 300B. An object 310 that indicates the current traveling direction of the target user P and route display objects 321 and 323 that indicate the route generated by the route generation unit 325 are displayed in the route presentation area 302. The object 310 is displayed in association with an object 304 indicating the position of the target user P. The objects 304 and 310 indicating the actual situation of the target user P can be displayed, in one example, on the basis of the orientation of the device acquired by a sensor provided in the smartphone 100B.

The shapes of the objects 310, 321, and 323 are not limited, and the use of the shape of an arrow in a similar way to FIG. 7 makes it possible for the target user P to recognize easily the traveling direction. In addition, as illustrated in FIG. 8, a text describing the contents of the object may be displayed together. Furthermore, the route guidance may be given by voice to the target user through a loudspeaker or the like provided in the smartphone 100B. Alternatively, the route guidance may be given to the target user by causing the smartphone 100B to be vibrated or to be subject to haptic feedback.

Further, the map display area 330 in which the entire map including the floor where the destination exists is displayed may be displayed on the screen 300B, which is similar to the case of FIG. 7. The current positions of other target users A, B, and C may be displayed in the map display area 330. This makes it possible for the target user P to recognize the aggregate situation of participants in the subsequent schedule. Furthermore, in one example, a subject target display area 343 that issues a notification of the subject target user subject to the target user P and a subject target scheduled arrival time display area 345 that displays the scheduled time at which the subject target user arrives at the destination may be displayed on the screen 300B. This makes it possible for the target user P to recognize detailed information on the situation of a particular other target user. In one example, it is possible to know the scheduled arrival time of the target user who is late in the conference time.

Further, an information acquisition time display area 350 that indicates the acquisition time of information displayed in the display area 330, the subject target display area 343, and the subject target scheduled arrival time display area 345 may be displayed on the screen 300B.

(c) Wristband Type Terminal

Next, an example of route presentation when the target user is using a wristband type terminal 100C is illustrated in FIG. 9. FIG. 9 illustrates an example of a screen 300C viewed by the target user who wears the wristband type terminal. The route guidance to the target user, notification of the situation of other target users, and the like are also performed on the screen 300C, which is similar to the screen 300A of FIG. 7. However, as illustrated in FIG. 9, the display area of the screen 300C of the wristband type terminal 100C is small, so the amount of information that can be further displayed is smaller than that of UI for eyewear terminal in FIG. 7 or UI for smartphone in FIG. 8.

Thus, as illustrated in FIG. 9, in one example, in the case of the wristband type terminal 100C, a route presentation area 302 that performs route guidance to the target user P is displayed by giving priority to route guidance to the user. The object 310 indicating the current traveling direction of the target user P is displayed in the route presentation area 302 in association with the object 304 indicating the position of the target user P, which is similar to the case of FIG. 8. In addition, the route display objects 321 and 323 displaying the route generated by the route generation unit 325 are displayed in the route presentation area 302.

The shapes of the objects 310, 321, and 323 are not limited to the arrow shape, and the use of the shape of an arrow in a similar way to FIG. 7 makes it possible for the target user P to recognize easily the traveling direction. In addition, as illustrated in FIG. 8, a text describing the contents of the object may be displayed together. Furthermore, the route guidance may be given by voice to the target user through a loudspeaker or the like provided in the wristband type terminal 100C or other terminal that the user wears, which is operable through the wristband type terminal 100C. In addition, the route guidance may be given to the target user by causing the wristband type terminal 100C or other terminal that the user wears, which is operable through the wristband type terminal 100C, to be vibrated or to be subject to haptic feedback. Moreover, the time displayed on the screen 300C in FIG. 9 may be, in one example, the scheduled arrival time at which the target user P arrives at the destination.

Further, operation buttons or the like of the wristband type terminal 100C illustrated in FIG. 9 may allow the display contents of the screen 300C to be switchable. In one example, the screen for guiding a route to the target user P as illustrated in FIG. 9 and the map display area display screen for displaying the entire map including the floor where the destination exists may be switchable. This makes it possible for the target user to acquire information that is not displayed on the screen 300C as necessary.

In this way, the route presentation to the target user using the eyewear terminal makes it possible for the target user to arrive at the destination smoothly by the scheduled start time as long as the target user acts in accordance with the guidance. In addition, the notification of the current position or state of other target user makes it possible to recognize the situation of the person who is late to the schedule of the conference or the like. Then, when the action support is performed for a certain schedule and the schedule is completed, the information processing system 1 detects the update timing in step S100 of FIG. 3 and starts the processing of performing the action support for the subsequent action.

The action support function by the information processing system 1 according to the first embodiment of the present disclosure is described above. According to the present embodiment, on the basis of information acquired by analyzing schedule information, action recognition, positioning processing, or the like, the schedule for performing the action support and the target user thereof are determined, and the target user is guided to the target place. In this event, the information processing system 1 displays the positioning information of a plurality of target users on the map depending on the current situation of a plurality of users, or performs determination, reservation, notification, or the like of an optimal destination (e.g., a conference room) from the current position and schedule of each target user. In this way, it is possible to determine an optimal action by considering the current situation or subsequent action and to present it to each user by disclosing the current situation of each user among users demanding it or allowing it to be used by them, thereby improving the efficiency of daily life and work of each user.

2. Second Embodiment

An action support function by an information processing system 1 according to a second embodiment of the present disclosure is now described with reference to FIG. 10. The configuration and function of the information processing system 1 according to the present embodiment can be identical to the system described with reference to FIG. 2, so the description thereof is omitted here. In the present embodiment, action support processing for a case where the information processing system 1 is used for waiting in the station premises is described.

Figure 10:
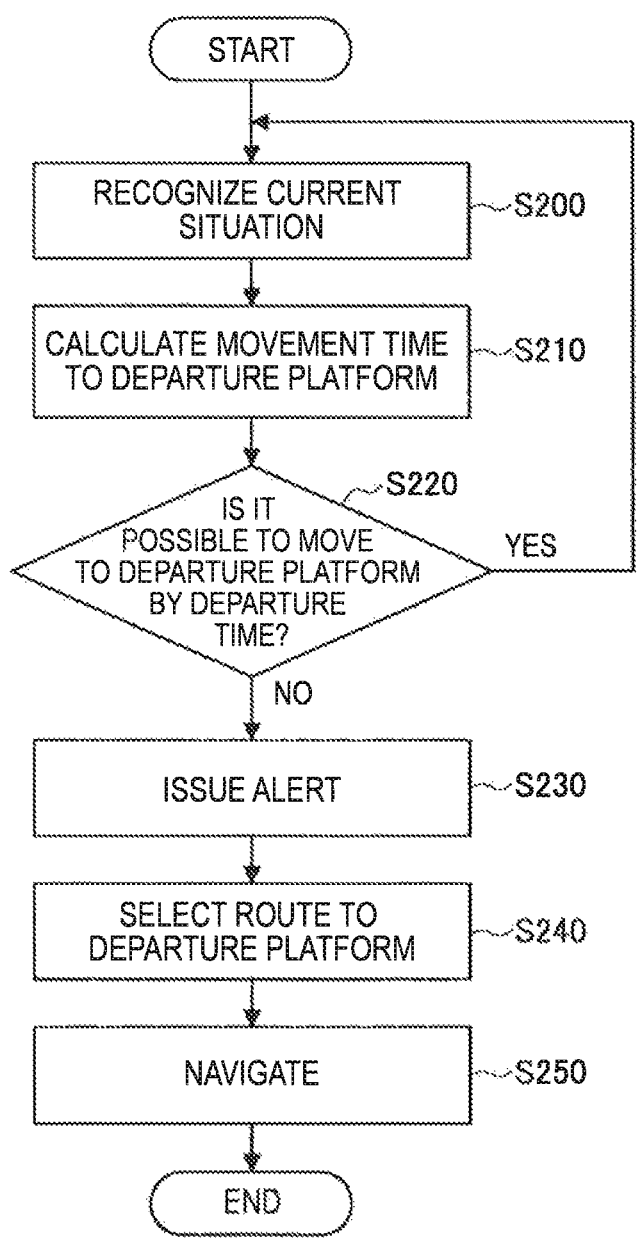
FIG. 10 is a flowchart illustrating action support processing performed by an information processing system according to a second embodiment of the present disclosure.

FIG. 10 is a flowchart illustrating the processing of supporting the action of the user who waits in the station premises, which is performed by the information processing system 1 according to the present embodiment. In this use case, description is given on the processing of managing such that when a plurality of users who are scheduled to ride on the same train, such as a family or a group, freely act in the station premises until the departure time, each user does not miss the train to board. In this event, the information processing system 1, when acquiring the time, place, and action of each user and determining that the condition for missing the train is satisfied, generates a route to guide the user to the departure platform of the train scheduled to board and presents it to the user. Here, it is assumed that the user terminal 100 or the like acquires the situation of each user and the result obtained by analyzing it by the analysis unit 120 is transmitted from the user terminal 100 to the server 200 at a predetermined timing. In addition, as the subsequent schedule for supporting the action by the information processing system 1, it is determined to ride the intended train and the target user is also selected.

First, as illustrated in FIG. 10, the situation acquisition unit 231 of the action support information generation unit 230 in the server 200 recognizes the current action situation for each target user (S200). In this event, the situation acquisition unit 231 acquires the action, position, state, and the like of each user, which are analyzed by the user terminal 100 using various sensors 110 or the external sensor information acquisition unit 115 and are stored in the user situation DB 250. In step S200, it is possible to acquire information as to what the target user is doing at which position in the station premises.

Next, the situation acquisition unit 231 calculates a movement time necessary from the current position of each user to the departure platform of the train scheduled to board (S210). The situation acquisition unit 231 refers to the map of the station premises stored in the equipment information DB 260 and calculates the movement time from the current position to the departure platform for each user. In this event, congestion situation in the station premises may be taken into consideration.

Then, the situation acquisition unit 231 compares the calculated movement time with the remaining time from the current time to the departure time of the train, and determines whether the user can move to the departure platform by the departure time (S220). In this event, the remaining time may be set with a margin of about two or three minutes. In the case where the time calculated in step S210 is shorter than the remaining time, it is determined that the user will be in time for departure even if the user does not go to the departure platform yet. Then, the processing returns to step S200, and repeats the processing. On the other hand, if the time calculated in step S210 is longer than the remaining time, the situation acquisition unit 231 starts moving the user to the departure platform to be in time for the departure time.

First, the situation acquisition unit 231 notifies the user terminal 100 that the user is necessary to start moving (S230). The alert of the start of movement to the user may be made, in one example, by sound, vibration, haptic sense, or the like. Subsequently, the destination is predetermined as the departure platform, so the route generation unit 235 generates a route for guiding the user to the departure platform and determines the route (S240). The route generation processing may be performed in a similar way to that of step S150 in FIG. 3 described above. In one example, the route generation unit 235 generates a route that is in time for departure time and that the user can easily move by using information including a map indicating the entire station premises, the staying position and movement of people in the station premises, the action tendency of the user, or the like.

More specifically, the congestion situation in the station premises from the staying position and movement of the people in the station premises can be recognized to move preferentially through a smoothly movable path while avoiding congestion. Alternatively, from the action tendency of the user, a route using a stairway is set in the case of using a stairway normally upon upward and downward movements, or a route using an escalator, elevator, or the like may be set when the user has a large baggage such as a suitcase.

Then, the route generated by the route generation unit 235 is notified to the user terminal 100 and is presented to the user through the output unit 160 (S250). The user moves while referring to the presented route, so the user can move smoothly without missing the train.

The action support function by the information processing system 1 according to the second embodiment of the present disclosure is described above. According to the present embodiment, in the case where a plurality of users who are scheduled to ride on the same train freely act in the station premises until departure time, it is determined whether it is in time for departure time of the train on the basis of the current position of each user. If it is not in time, a route for guiding the user to the departure platform is generated and is presented to the user. In this way, the information processing system 1 according to the present embodiment makes it possible to manage so that each user does not miss the train scheduled for boarding.

3. Third Embodiment

An action support function by an information processing system 1 according to a third embodiment of the present disclosure is now described with reference to FIG. 11. The configuration and the function of the information processing system 1 according to the present embodiment can be identical to the system described with reference to FIG. 2, so the description thereof is omitted here. In the present embodiment, an action support process for a case where the information processing system 1 is used for waiting at a shopping mall, an indoor theme park, or the like is described.

Figure 11:
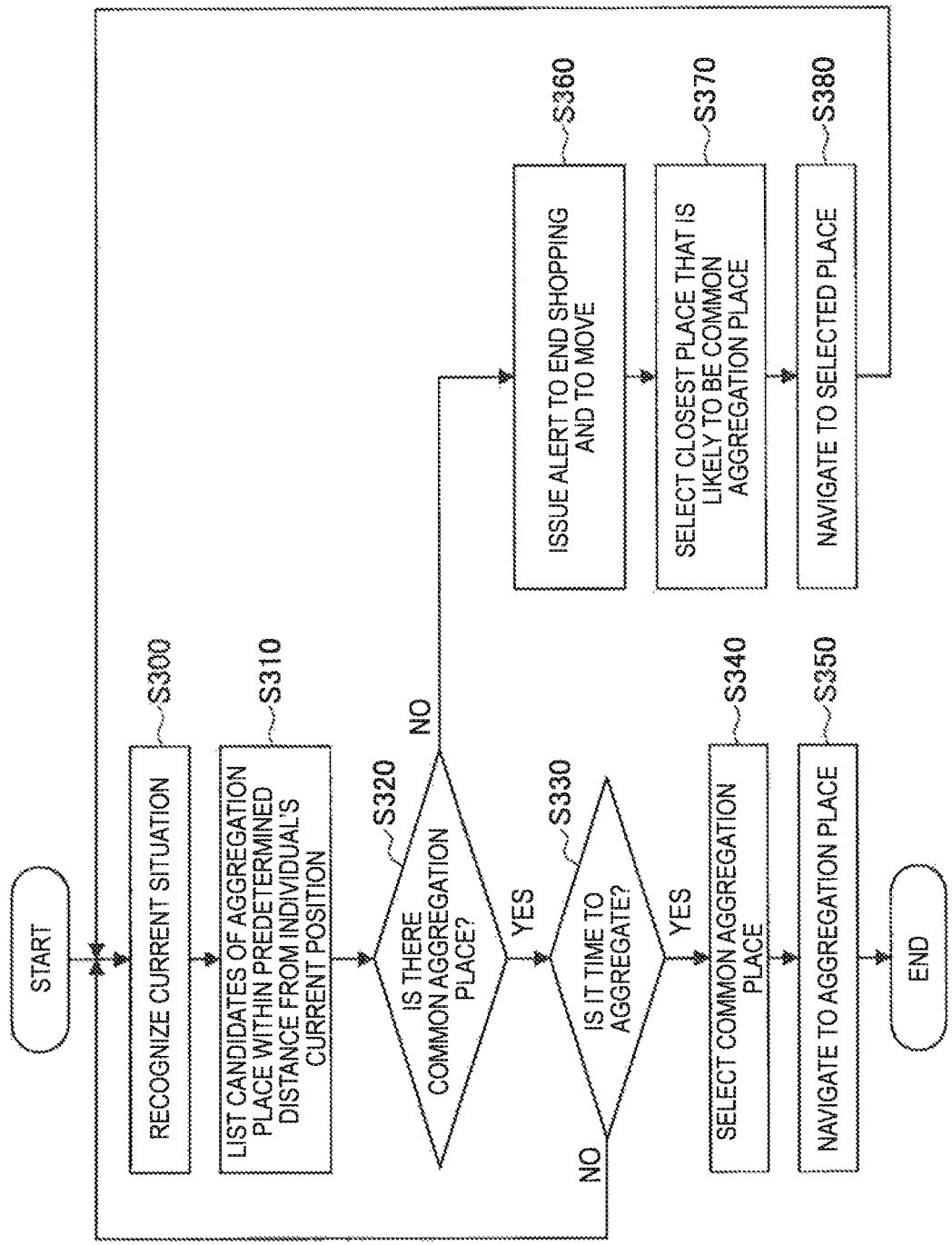
FIG. 11 is a flowchart illustrating action support processing performed by an information processing system according to a third embodiment of the present disclosure.

FIG. 11 is a flowchart illustrating the processing of performing the action support of the user who waits at a shopping mall, which is performed by the information processing system 1 according to the present embodiment. In this use case, the description is given on the case where aggregation position is selected and it aggregates at set time depending on the situation of a plurality of users such as a family and a group. Here, it is assumed that the user terminal 100 or the like acquires the situation of each user and the result obtained by analyzing it by the analysis unit 120 is transmitted from the user terminal 100 to the server 200 at a predetermined timing. In addition, aggregation is assumed to be made in a predetermined place at the conference time as the subsequent schedule for action support by the information processing system 1, and the target user is assumed to be selected. The aggregation place is assumed to be selected as an optimal place depending on ease of aggregation of each user at the aggregation place from among aggregation place candidates that are set in advance rather than a particular place determined in advance.

First, as illustrated in FIG. 11, the situation acquisition unit 231 of the action support information generation unit 230 in the server 200 recognizes the current action situation for each target user (S300). In this event, the situation acquisition unit 231 acquires the action, position, state, and the like of each user, which are analyzed by the user terminal 100 using various sensors 110 or the external sensor information acquisition unit 115 and are stored in the user situation DB 250. In step S200, it is possible to acquire information as to what the target user is doing at which position in the station premises.

Next, the situation acquisition unit 231 refers to the equipment information DB 260 and lists aggregation place candidates within a predetermined range from the current position of each user (S310). Then, the situation acquisition unit 231 determines whether there is an aggregation place candidate common to all users from among the aggregation place candidates listed for each user (S320). If there is an aggregation place candidate common to all users, this means that all the members are easy to aggregate. Thus, the situation acquisition unit 231 determines whether it is an aggregation time or not, and if there is a predetermined time or more until the aggregation time, the processing in step S300 and subsequent steps is repeated. In this case, each user can freely act continuously.

On the other hand, if it is determined in step S330 that the aggregation time is shorter than the predetermined time, the destination selection unit 233 selects an aggregation place candidate common to all the users as the aggregation place (destination) (S340). Then, a route to the selected aggregation place is generated by the route generation unit 235 and is presented to each user (S350). In this event, the optimal route is selected depending on the degree of congestion of facilities such as shopping malls.

On the other hand, if it is determined in step S320 that there is no aggregation place candidate common to all the users, the situation acquisition unit 231 determines that it is difficult for all the users to aggregate at scheduled time on schedule and moves the users so that they are easy to aggregate. First, the situation acquisition unit 231 notifies the user terminal 100 that the user is necessary to start moving (S360). The alert of the start of movement to the user may be made, in one example, by sound, vibration, haptic sense, or the like.

Next, the destination selection unit 233 selects a destination to which the user is to be moved (S370). In step S370, a place that is most likely to be an aggregation place among the aggregation place candidates listed in step S310 is set as a destination to which the user is to be moved. In one example, the most common aggregation place candidate among the aggregation place candidates listed for each user in step S310 may be set as the place that is most likely to be the aggregation place. Alternatively, an aggregation place candidate that is approximately equidistant from all the users may be set as the place that is most likely to be the aggregation place.

Then, if the destination to which the user is to be moved is determined, a route for guiding the user to the destination is generated by the route generation unit 235 and is presented to the user (S380). In this event, it is unnecessary to move all the users, and in one example, only the user who has not listed the destination selected in step S370 as the aggregation place candidate may be moved. This eliminates the need for all the users to interrupt their shopping. Alternatively, in some cases, it is possible to reduce the movement distance of each user by moving all the users by substantially the same distance. If the user is moved to the destination in step S380, the processing returns to step S300, and the user is allowed to act freely until the aggregation time again.

The action support function by the information processing system 1 according to the third embodiment of the present disclosure is described above. According to the present embodiment, in the case where a plurality of users are freely acting until departure time, it is determined whether the users can be aggregated from the current position of each user to a predetermined place at the aggregation time. If it is not in time, at least one person is moved to a predetermined position so that it is easy to aggregate at the aggregation time. In this way, the information processing system 1 according to the present embodiment makes it possible to manage so that each user can aggregate in the optimal place as the aggregation place at the aggregation time.

The action support processing according to the present embodiment is also applicable, in one example, to a case where a plurality of people such as family members and groups aggregate in an indoor theme park. Specifically, in one example, in a situation where each user is experiencing different attractions, it is applicable to a case where target users are aggregated so that a plurality of users are in time for the start time of the next attraction scheduled to participate. In addition, from the attraction schedule and individual schedule (or the attraction schedule automatically selected from the preference of each user's attraction), it is possible to select attractions that allow participation in attractions at the same time among family members and groups, and it is also possible to navigate each user. This makes it possible to optimize the preference of each user and guide all of them to enjoy them together.

4. Hardware Configuration

The hardware configuration of the information processing device according to an embodiment of the present disclosure is now described with reference to FIG. 12. FIG. 12 is a block diagram illustrating a hardware configuration example of the information processing device according to the embodiment of the present disclosure. An information processing device 900 illustrated in FIG. 12 can be implemented as, in one example, the user terminal 100 or the server 200 in the embodiments described above.

The information processing device 900 includes a central processing unit (CPU) 901, a read only memory (ROM) 903, and a random access memory (RAM) 905. In addition, the information processing device 900 may include a host bus 907, a bridge 909, an external bus 911, an interface 913, an input device 915, an output device 917, a storage device 919, a drive 921, a connector port 923, and a communication device 925. Furthermore, the information processing device 900 may include the image capture device 933 and the sensor 935 as needed. Instead of or in addition to the CPU 901, the information processing device 900 may have a processing circuit such as a digital signal processor (DSP), application specific integrated circuit (ASIC), field-programmable gate array (FPGA), or the like.

The CPU 901 functions as an arithmetic processing device and a control device, and controls the overall operation in the information processing device 900 or a part thereof in accordance with various programs recorded in the ROM 903, the RAM 905, the storage device 919, or the removable recording medium 927. The ROM 903 stores programs used by the CPU 901, operation parameters, and the like. The RAM 905 primarily stores programs to be used in the execution of the CPU 901, parameters that change as appropriate in the execution thereof, and the like. The CPU 901, the ROM 903, and the RAM 905 are mutually connected via a host bus 907 that is constituted by an internal bus such as a CPU bus. Further, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, a lever, and the like. In one example, the input device 915 may be a remote control device using infrared rays or other radio waves, or may be an external connection device 929, such as a cellular phone, corresponding to the operation on the information processing device 900. The input device 915 includes an input control circuit that generates an input signal on the basis of the information input by the user and outputs it to the CPU 901. The user operates the input device 915 to input various kinds of data to the information processing device 900 and to instruct the information processing device 900 to perform processing operations.

The output device 917 is a device capable of notifying the user of the acquired information by using sensation such as visual sense, auditory sense, or haptic sense. The output device 917 may be, in one example, a display device such as a liquid crystal display (LCD) and an organic electro-luminescence (EL) display, a sound output device such as loudspeaker and headphone, or a vibrator. The output device 917 outputs the result obtained by the processing of the information processing device 900 in the form of a projected image such as text and picture, audio such as voice and sound, vibration, or the like.

The storage device 919 is a device for data storage, configured as one example of a storage unit of the information processing device 900. The storage device 919 is constituted by, in one example, a magnetic storage unit device such as hard disk drive (HDD), a semiconductor storage device, an optical storage device, a magneto-optical storage device, or the like. The storage device 919 stores, in one example, programs executed by the CPU 901 or various data, various data acquired from the outside, and the like.

The drive 921 is a reader-writer for the removable recording medium 927 such as a magnetic disk, an optical disk, a magneto-optical disk, a semiconductor memory, or the like, and is incorporated in the information processing device 900 or externally attached thereto. The drive 921 reads the information recorded in the attached removable recording medium 927 and outputs it to the RAM 905. In addition, the drive 921 writes a record in the attached removable recording medium 927.

The connector port 923 is a port for connecting the device to the information processing device 900. The connector port 923 may be, in one example, a universal serial bus (USB) port, an IEEE 1394 port, a small computer system interface (SCSI) port, or the like. Further, the connector port 923 may be an RS-232C port, an optical audio terminal, a high-definition multimedia interface (HDMI: registered trademark) port, or the like. The connection of the external connection device 929 to the connector port 923 allows various kinds of data to be exchanged between the information processing device 900 and the external connection device 929.

The communication device 925 is, in one example, a communication interface constituted by a communication device or the like for connecting to the communication network 931. The communication device 925 may be, in one example, a communication card for local area network (LAN), Bluetooth (registered trademark), Wi-Fi, or wireless USB (WUSB). Further, the communication device 925 may be a router for optical communication, a router for asymmetric digital subscriber line (ADSL), a modem for various communications, or the like. The communication device 925 transmits and receives signals and the like using a predetermined protocol such as TCP/IP, in one example, with the Internet and other communication devices. The communication network 931 connected to the communication device 925 is a network connected by wire or wireless, and may include, in one example, the Internet, home LAN, infrared communication, radio wave communication, satellite communication, or the like.

The image capture device 933 is a device that captures a real space to generate a captured image, by using various components including an image sensor such as complementary metal oxide semiconductor (CMOS) or charge coupled device (CCD) and a lens used to control image formation of a subject image on the image sensor. The image capture device 933 may capture still or moving images.

The sensor 935 may be, in one example, various sensors such as an acceleration sensor, an angular velocity sensor, a geomagnetic sensor, an illuminance sensor, a temperature sensor, a barometric sensor, or a sound sensor (microphone). The sensor 935 acquires information on the state of the information processing device 900 itself such as the attitude of the casing of the information processing device 900, or acquires information on the surrounding environment of the information processing device 900 such as the brightness and noise around the information processing device 900. The sensor 935 may also include a GPS receiver, which receives a global navigation satellite system (GNSS) signal and measures the latitude, longitude, and altitude of the device.

An example of the hardware configuration of the information processing device 900 has been described above. Each of the above-described components may be configured using general-purpose members, or may be configured with hardware specialized for the function of each component. Such a configuration can be modified as appropriate depending on the technical level at the time of carrying out the embodiments.

5. Supplement

Embodiments of the present disclosure can be applied to, in one example, the information processing device (e.g., a server) as described above, a system, an information processing method executed in an information processing device or a system, a program for causing an information processing device to function, and a non-transitory tangible medium having the program recorded thereon.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a processing unit configured to perform action support for a subsequent schedule to be optimal for each of a plurality of target users on the basis of user situation in indoor environment acquired for each target user that participates in the subsequent schedule.

(2)

The information processing device according to (1), in which the processing unit presents at least one movement route to a destination of the subsequent schedule to the target user.

(3)

The information processing device according to (2), in which the processing unit generates a movement route of the target user, when the target user is acting together with another user prior to the subsequent schedule, on the basis of a degree of intimacy between users.

(4)

The information processing device according to (2) or (3), in which the processing unit generates a movement route in which the target user joins another target user before the target user arrives at the destination of the subsequent schedule on the basis of a current position of each of the target users.

(5)

The information processing device according to any one of (1) to (4), in which the processing unit determines the subsequent destination on the basis of a current position of each of the target users and a start time of the subsequent schedule.

(6)

The information processing device according to (5), in which the processing unit determines the subsequent destination using weighting set for the target user or a candidate for the destination of the subsequent schedule.

(7)

The information processing device according to (6), in which the weighting for the target user is set on the basis of at least one of current busyness of the target user or a type of a current action.

(8)

The information processing device according to (6), in which the weighting for the candidate for the destination is set on the basis of at least one of comfort or convenience of the destination.

(9)

The information processing device according to any one of (5) to (8), in which the processing unit presents a candidate for the subsequent destination, when there is a predetermined time or more until the start time of the subsequent schedule, on the basis of the current position of the target user or a current time.

(10)

The information processing device according to any one of (1) to (9), further including:
a subsequent action determination unit configured to determine the subsequent schedule,
in which the subsequent action determination unit determines the subsequent schedule on the basis of at least one of pre-registered schedule information or an action estimated on the basis of the user situation.

(11)

The information processing device according to (10), in which the subsequent action determination unit estimates a subsequent action of the target user on the basis of at least one of an action recognition result or positioning information analyzed on the basis of the user situation.

(12)

The information processing device according to any one of (1) to (11), further including:
a target person selection unit configured to select a target user that participates in the subsequent schedule,
in which the target person selection unit selects the target user on the basis of at least one of pre-registered schedule information or an action estimated on the basis of the user situation.

(13)

An information processing method including:
performing, by a processor, action support for a subsequent schedule to be optimal for each of a plurality of target users on the basis of user situation in indoor environment acquired for each target user that participates in the subsequent schedule.

(14)

A program causing a computer to function as an information processing device including:
a processing unit configured to perform action support for a subsequent schedule to be optimal for each of a plurality of target users on the basis of user situation in indoor environment acquired for each target user that participates in the subsequent schedule.

REFERENCE SIGNS LIST 100 user terminal
110 various sensors
115 external sensor information acquisition unit
120 analysis unit
121 action recognition unit
123 positioning processing unit
130 update timing detection unit
140 input unit
150 navigation processing unit
160 output unit
210 subsequent action determination unit
220 target person selection unit
230 action support information generation unit
231 situation acquisition unit
233 destination selection unit
235 route generation unit
240 schedule information DB
250 user situation DB
260 equipment information DB

The invention claimed is:

1. An information processing device comprising:
a processing unit configured to
perform action support for a subsequent schedule for each target user of a plurality of target users based on a user situation in an indoor environment acquired for each target user that participates in the subsequent schedule, and
initiate presentation of at least one movement route to a destination of the subsequent schedule to each target user,
wherein the user situation acquired for each target user includes a current position of the target user and a current movement state of the target user within the indoor environment,
wherein the user situation is acquired for each target user based on information received from one or more sensors,
wherein the processing unit is further configured to initiate presentation of the current position and the current movement state of one or more other target users of the plurality of target users within a map corresponding to the indoor environment, and
wherein the processing unit is implemented via at least one processor.

2. The information processing device according to claim 1,
wherein the processing unit generates the at least one movement route of the target user, when the target user is acting together with another user prior to the subsequent schedule, based on a degree of intimacy between users.

3. The information processing device according to claim 1,
wherein the processing unit generates the at least one movement route in which the target user joins another target user of the plurality of target users before the target user arrives at the destination of the subsequent schedule based on the current position of each target user of the plurality of target users.

4. The information processing device according to claim 1,
wherein the processing unit determines a subsequent destination based on the current position of each target user of the plurality of target users and a start time of the subsequent schedule.

5. The information processing device according to claim 4,
wherein the processing unit determines the subsequent destination using at least one of weighting set for each target user or a candidate for the destination of the subsequent schedule.

6. The information processing device according to claim 5, wherein the weighting for each target user is set based on the current movement state of the target user.

7. The information processing device according to claim 5,
wherein the weighting for the candidate for the destination is set based on at least one of comfort or convenience of the destination.

8. The information processing device according to claim 4,
wherein the processing unit presents a candidate for the subsequent destination for each target user, when there is a predetermined time or more until the start time of the subsequent schedule, based on the current position of the target user and a current time.

9. The information processing device according to claim 1, further comprising:
a subsequent action determination unit configured to determine the subsequent schedule,
wherein the subsequent action determination unit determines the subsequent schedule based on at least one of pre-registered schedule information or an action estimated based on the user situation for each target user, and
wherein the subsequent action determination unit is implemented via at least one processor.

10. The information processing device according to claim 9,
wherein the subsequent action determination unit estimates a subsequent action of each target user based on at least one of an action recognition result or positioning information analyzed based on the user situation.

11. The information processing device according to claim 1, further comprising:
a target person selection unit configured to select each target user that participates in the subsequent schedule,
wherein the target person selection unit selects each target user based on at least one of pre-registered schedule information or an action estimated based on the user situation for the target user.

12. An information processing method comprising:
performing, by a processor, action support for a subsequent schedule for each target user of a plurality of target users based on a user situation in an indoor environment acquired for each target user that participates in the subsequent schedule; and
presenting at least one movement route to a destination of the subsequent schedule to each target user,
wherein the user situation acquired for each target user includes a current position of the target user and a current movement state of the target user within the indoor environment,
wherein the user situation is acquired for each target user based on information received from one or more sensors, and
wherein the method further comprises presenting the current position and the current movement state of one or more other target users of the plurality of target users within a map corresponding to the indoor environment.

13. A non-transitory computer-readable storage medium having embodied thereon a program, which when executed by a computer causes the computer to execute an information processing method, the method comprising:
performing action support for a subsequent schedule for each target user of a plurality of target users based on a user situation in an indoor environment acquired for each target user that participates in the subsequent schedule; and
presenting at least one movement route to a destination of the subsequent schedule to each target user,
wherein the user situation acquired for each target user includes a current position of the target user and a current movement state of the target user within the indoor environment,
wherein the user situation is acquired for each target user based on information received from one or more sensors, and
wherein the method further comprises presenting the current position and the current movement state of one or more other target users of the plurality of target users within a map corresponding to the indoor environment.

14. The information processing device according to claim 1,
wherein the processing unit performs the action support for each target user by providing information regarding the user situation of the one or more other target users of the plurality of target users.

15. The information processing device according to claim 1,
wherein the current movement state of the one or more other target users is indicated by an icon associated with the current position of the one or more other target users within the map corresponding to the indoor environment.

* * * * *